(12) United States Patent
Orban et al.

(10) Patent No.: US 9,081,110 B2
(45) Date of Patent: Jul. 14, 2015

(54) DEVICES, SYSTEMS AND METHODS FOR LOW FREQUENCY SEISMIC BOREHOLE INVESTIGATIONS

(71) Applicant: Schlumberger Technology Corporation, Sugar Land, TX (US)

(72) Inventors: Jacques Orban, Gloucestershire (GB); Neilkunal Panchal, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/719,065

(22) Filed: Dec. 18, 2012

(65) Prior Publication Data

US 2014/0169128 A1    Jun. 19, 2014

(51) Int. Cl.
| | |
|---|---|
| *G01V 1/40* | (2006.01) |
| *G01V 1/52* | (2006.01) |
| *G01V 1/047* | (2006.01) |
| *E21B 47/14* | (2006.01) |
| *G01V 1/143* | (2006.01) |
| *G01V 1/00* | (2006.01) |

(52) U.S. Cl.
CPC ........ *G01V 1/143* (2013.01); *G01V 2210/1299* (2013.01)

(58) Field of Classification Search
USPC ............ 181/106, 105, 102, 104, 111; 367/25, 367/35, 82, 189, 190
See application file for complete search history.

(56) References Cited

U.S. PATENT DOCUMENTS

| | | | | |
|---|---|---|---|---|
| 2,191,121 | A | * | 2/1940 | Slichter .......................... 181/102 |
| 2,396,935 | A | * | 3/1946 | Walstrom ...................... 181/102 |
| 3,475,722 | A | * | 10/1969 | White .............................. 367/31 |
| 3,564,914 | A | * | 2/1971 | Desai et al. ................. 73/152.16 |
| 3,883,841 | A | * | 5/1975 | Norel et al. ...................... 367/25 |
| 4,641,724 | A | * | 2/1987 | Chow et al. .................... 181/104 |
| 4,702,343 | A | | 10/1987 | Paulsson |
| 4,744,438 | A | * | 5/1988 | Ruzie et al. .................... 181/102 |
| 4,757,873 | A | * | 7/1988 | Linyaev et al. ............... 181/105 |
| 4,800,537 | A | * | 1/1989 | Mount, II ......................... 367/35 |
| 4,805,725 | A | * | 2/1989 | Paulsson ....................... 181/106 |
| 4,809,237 | A | * | 2/1989 | Vogel et al. ..................... 367/35 |

(Continued)

FOREIGN PATENT DOCUMENTS

| | | |
|---|---|---|
| WO | 01/40623 | 6/2001 |
| WO | 2012/027105 | 3/2012 |

OTHER PUBLICATIONS

International search report for the equivalent PCT patent application No. PCT/IB2013/061065 issued on Apr. 23, 2014.

*Primary Examiner* — Edgardo San Martin
(74) *Attorney, Agent, or Firm* — Daryl R. Wright; Wesley Noah

(57) ABSTRACT

Downhole seismic sources that may be compatible measurement-while-drilling systems. The downhole seismic sources are integrated into drill string components, including drill collars of the bottom hole assembly. The downhole seismic sources may generate a low swept frequency signal suitable for imaging around the drill-string and ahead of the drill bit. Integrated downhole seismic systems including a downhole seismic source, receivers and optionally data processing capabilities. The integrated systems may be configured to determine the distance and orientation of bed boundaries, including ahead of the drill bit up to about 200 m to 500 m in depth. Methods for downhole seismic, including single well and cross-well seismic. The methods may include obtaining seismic information ahead of the drill bit.

23 Claims, 18 Drawing Sheets

(56) References Cited

U.S. PATENT DOCUMENTS

| | | | |
|---|---|---|---|
| 4,811,814 A * | 3/1989 | Staron et al. | 181/108 |
| 4,852,069 A * | 7/1989 | Clerke et al. | 340/856.3 |
| 4,874,060 A * | 10/1989 | Guerendel et al. | 181/102 |
| 4,899,320 A * | 2/1990 | Hearn et al. | 367/35 |
| 5,031,717 A * | 7/1991 | Hardee et al. | 181/106 |
| 5,044,461 A * | 9/1991 | Aronstam | 181/102 |
| 5,111,903 A * | 5/1992 | Meynier | 181/102 |
| 5,115,880 A * | 5/1992 | Sallas et al. | 181/106 |
| 5,146,050 A * | 9/1992 | Strozeski et al. | 181/102 |
| 5,229,554 A * | 7/1993 | Cole | 181/106 |
| 5,242,020 A * | 9/1993 | Cobern | 166/254.2 |
| 5,309,405 A * | 5/1994 | Brett et al. | 367/36 |
| 5,382,760 A * | 1/1995 | Staron et al. | 181/121 |
| 5,563,846 A * | 10/1996 | Fillon | 367/25 |
| 5,678,643 A | 10/1997 | Robbins et al. | |
| 6,157,893 A * | 12/2000 | Berger et al. | 702/9 |
| 6,170,601 B1 * | 1/2001 | Nakajima et al. | 181/102 |
| 6,173,804 B1 * | 1/2001 | Meynier | 181/102 |
| 6,179,084 B1 * | 1/2001 | Yamamoto et al. | 181/106 |
| 6,513,591 B1 * | 2/2003 | Heijnen | 166/250.08 |
| 6,670,813 B2 * | 12/2003 | Strack | 324/323 |
| 6,837,332 B1 * | 1/2005 | Rodney | 181/105 |
| 6,868,035 B2 * | 3/2005 | West | 367/25 |
| 6,997,258 B2 * | 2/2006 | Homan et al. | 166/254.2 |
| 7,048,089 B2 * | 5/2006 | West et al. | 181/105 |
| 7,252,174 B2 * | 8/2007 | Cox et al. | 181/111 |
| 7,389,828 B2 * | 6/2008 | Ritter et al. | 175/40 |
| 7,436,185 B2 * | 10/2008 | Fredette et al. | 324/367 |
| 7,578,359 B2 * | 8/2009 | Coates et al. | 175/40 |
| 7,864,629 B2 * | 1/2011 | Jones et al. | 367/25 |
| 2004/0240320 A1 | 12/2004 | McDonald et al. | |
| 2005/0279532 A1 * | 12/2005 | Ballantyne et al. | 175/40 |
| 2008/0053707 A1 * | 3/2008 | Martinez et al. | 175/73 |
| 2009/0242317 A1 * | 10/2009 | Tashiro et al. | 181/106 |
| 2010/0101861 A1 | 4/2010 | Chang | |
| 2010/0224360 A1 * | 9/2010 | MacDougall et al. | 166/250.01 |
| 2011/0231097 A1 | 9/2011 | Market | |

* cited by examiner

DEVICES, SYSTEMS AND METHODS FOR LOW FREQUENCY SEISMIC BOREHOLE INVESTIGATIONS

FIELD

The present disclosure relates to the evaluation of underground formations and structures, for example as it relates to oil and gas exploration. The present disclosure relates more specifically to seismic surveying of subterranean geological formations while drilling.

BACKGROUND

Borehole seismic investigation is of interest to oil and gas exploration professionals because it can provide a deeper penetration into a formation than other available investigation techniques. However, current borehole seismic methods can face limitations in their implementation. For example, borehole seismic survey systems may involve sources located at the surface and receivers placed in the well: such methods can be wireline Vertical Seismic Profiling (VSP) type seismic acquisition, or Logging While Drilling (LWD) applications (such as the Schlumberger (SLB) Seismic LWD system). Other configurations may be possible, for example the drill bit can function as the seismic source and receivers can be placed at the surface. In either case, the distance between source and receivers can result in signal attenuation (especially for the high frequency content of the signal) and loss of resolution. Such systems can also be economically challenging, as drilling should be stopped and the surveys often take extended time periods, for example with complex wireline VSP surveys, they may take several days to insure large surface coverage by the source. In all seismic images, there can be further challenges resulting from accurately converting the time scale data into depth information.

SUMMARY

The present disclosure provides devices, systems and methods for borehole seismic investigations while drilling, including low frequency devices, systems and methods for acquiring images around the drill-sting and ahead of the drill bit. In particular, a downhole seismic vibrator is provided for such imaging purposes.

According to some embodiments, the seismic devices of this disclosure include: at least two force generating members retractably connected to a first tubular in a drill string, which may be part of the bottom hole assembly, and where the force generating members are located at substantially the same axial position along the drill string; and a control system for activating the at least two force generating members to engage a borehole wall and transmit a seismic signal into a formation surrounding the borehole wall. In some embodiments, each one of the at least two force generating members includes a pad, which may be activated by a hydraulic piston; the pad may be pivotably or hingedly moveable relative to the drill string or the piston.

In some embodiments, the seismic signal includes a swept frequency signal over a wide range to improve the quality of the reflector detection. The frequency range can be from about 20 to about 200 Hz, but can extend up to about 700 Hz, or from about 5 Hz, or from about 10 Hz up to about 700 Hz, or to about 500 Hz, or up to about 400 Hz, or up to about 300 Hz or up to about 250 Hz. In some embodiments, the frequency range includes one or more generated harmonics within the range. In some embodiments, the devices produce a seismic signal having a sinusoidal shape. In some embodiments, the sinusoidal signal is a swept frequency. In further embodiments, the seismic signal amplitude ranges from about 1,000 to about 60,000 Newtons. In further embodiments, the device includes a feedback mechanism to insure the seismic signal has a desired shape over the range of frequencies, for example for maintaining the signal according to a reference signal.

In further embodiments, the at least two force generating members are distributed about a tubular in an axis-symmetric pattern. The at least two force generating members can be, for example, two members separated by 180 degrees, three members separated by 120 degrees, or four members separated by 90 degrees. In some embodiments, where the at least two force generating members are four force generating members, the four force generating members include a first pair of force generating members separated by 180 degrees and a second pair of force generating members separated by 180 degrees. In further embodiments, the first pair of force generating members is offset by 90 degrees from the second pair of force generating members. In some embodiments, the first and second pairs act asynchronously to generate a seismic signal. In some embodiments, the first and second pairs act synchronously to generate a seismic signal. The seismic signals generated can be sinusoidal in shape and/or can be a swept in frequency.

The disclosure also provides borehole seismic systems for acquiring seismic data downhole. In some embodiments, the systems include at least one downhole seismic source as described above and at least one downhole seismic receiver. For example, the downhole seismic source can be at least two force generating members integrally connected at about the same axial position along a drill-string tubular, where the at least two force generating members may be distributed axis-symmetrically about the tubular, and the source further includes a controller for activation of the source causing it to generate a seismic signal, for example a low frequency swept range seismic signal. In some embodiments, the systems are configured to image at a distance (penetration depth) of up to about 500 meters, or up to about 200 meters, for example including ahead of a drill bit and with a resolution of about (or better than) about 10 meters.

In some embodiments, the source(s) and receiver(s) are located in the same borehole, for example along the same drill string but, for example the source(s) and receiver(s) may be located on different tubulars. In some embodiments, at least one receiver is at least one receiver subsystem (sub) mounted on a drill-string tubular, the at least one receiver sub includes at least two seismic sensors. In further embodiments, the system is incorporated into four drill-string tubulars, for example, four adjacent drill string tubulars, where the seismic source is located on the first tubular closest to the drill bit, and a receiver sub is located on each of the second, third, and fourth tubulars. In yet further embodiments, the distance between tubulars results in an inter-receiver sub distance ranging from about 1λ (wavelength) to about 5λ when measured from the center of one receiver sub to the center of another receiver sub (the wavelength typically refers to the mean frequency of the transmitted signal), and the distance between receivers in a receiver sub ranges from about 3 to about 5 meters. In yet further embodiments, the inter-receiver sub distance is about 10 meters (30 feet) or about the same distance as the length of a drill-string tubular. In some embodiments, the systems include two sources on the same drill string, with the receiver subs located between the two sources. In some embodiments, the source(s) and receiver(s)

may be deployed in different boreholes, or some of the system components (e.g. a source and/or one or more receivers) may be deployed at the surface.

The disclosure also provides methods for borehole seismic investigations, including methods for low frequency borehole seismic investigations and methods of acquiring seismic information for producing images around the drill-string and ahead of the drill bit. In some embodiments, the methods include lowering a bottom hole assembly (BHA) into a borehole, where the BHA includes a seismic source having at least two moveable force generating members integrated with either a first tubular or a sleeve around the tubular; activating the seismic source causing it to transmit a low frequency seismic signal into a formation surrounding the borehole; and acquiring seismic data at a set of at least two receivers. In some embodiments, the set of at least two receivers is a receiver sub including at least two receivers, which receiver sub is integrated with a second tubular on the same drill string as the seismic source. In some embodiments, the receivers are deployed in a different borehole from the seismic source. In some applications, the drilling process is temporarily suspended during the seismic data acquisition, allowing the recovery of highly attenuated signal, as the noise level is lower.

In some embodiments, the methods include processing at least a portion of the acquired data, including reducing the amount of data prior to transmission of the data to the surface. In some embodiments, data processing/data reduction includes determining the location and orientation of a desired number of bed boundaries (reflectors) from the acquired data. In some embodiments, the desired number of bed boundaries is (or is at least) the first bed boundary closest to the seismic source in every direction around and ahead of the seismic source. In some embodiments, the desired number of bed boundaries is up to about ten close boundaries for every direction around and ahead of the seismic source; the number of the boundaries depends on formation properties so the number may vary from 1 to 10.

In some embodiments, reducing the amount of data involves application of a semblance processing between recorded data on adjacent receivers to determine signal arrival with delta-time for the adjacent receivers, which is an approach for determining location and orientation of a desired number of bed boundaries from the acquired data.

In some embodiments, seismic imaging involves estimating P- and S-waves from acquired data corresponding to spherical expansion in the surrounding formation around the source, more specifically from acquired data relating to P- and S-waves emitted from the source in a direct path to the receivers.

In some embodiments, the methods include synchronously activating the at least two force generating members to create a seismic signal. In some embodiments, the methods include asynchronously activating pairs of force generating members to create a seismic signal. In some embodiments, the source is activated (fired) when drilling is stopped, allowing seismic data acquisition in low noise condition: this drilling stop period can be the period for addition of tubular members to the drill string (connection time). In further embodiments, the source is activated at three different source positions approximately three meters apart allowing seismic data acquisition for limited axial displacement in the wellbore. These different positions for source activation and seismic data acquisition can be located after each new joint is drilled (i.e., each new tubular is added). The number of different positions corresponding to a joint length can be from 1 to 5, depending on the need for signal quality and image resolution.

In further embodiments, the source activation (transmission) time can extend from about 1 second (sec) to about 12 seconds (sec), depending on the frequency bandwidth to cover, as well as the signal-to-noise ratio to be achieved. The listening time at the end of the transmission can extend from about 0.25 sec to about 3 sec, depending on the distance the seismic wave travels (penetration depth), for example, the total acquisition time (transmission time+listening time) can extend from about 1.25 sec to about 15 sec. The required dead time between successive acquisition periods depends on the electronic system internal resource (to manage the data and the clock synchronization), as well as the physical time needed to position the source(s) and receiver(s) at the proper position. The dead-time plus total acquisition time defines the minimum cycle time.

In some embodiments, the movable pad is activated by hydraulic power derived from pressure differentials in the mud flow path. In some embodiments, a valve is controlled to deliver a hydraulic pressure on a piston to activate the moveable pads to deliver a desired push force. In some embodiments, the valve settings involve a feedback control to deliver the push force following input objective. In some embodiments, the feedback control may involve non-linear relationship between output and input. In some embodiments, the feedback control may involve some linearization of non-linear behavior for more stable drive. In some embodiments, the feedback control may involve calibration of a transfer function for particular conditions.

In some embodiments, there are two seismic sources, located at upper and lower (or first and second) axial positions along a drill string, and the receiver subs are located on a section of the drill string between the upper and lower (or first and second) sources, and the methods further include: activating the lower seismic source at a first location and acquiring a first data set; moving the drill string to position the upper source at the first location where the lower source was activated; activating the upper source and acquiring a second data set; and grouping the first data set with the second data set for analysis. The two sets of data are grouped to simulate data acquisition over a double coverage by the receiver subs while the source would be at the center of the "summed" receiver sub array, allowing deeper imaging of the surrounding formation.

The identified embodiments are exemplary only and are therefore non-limiting. The details of one or more non-limiting embodiments of the disclosure are set forth in the accompanying drawings and the descriptions below. Other embodiments of the disclosure should be apparent to those of ordinary skill in the art after consideration of the present disclosure.

DETAILED DESCRIPTION

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise. Therefore, "for example a mud turbine generator" means "for example and without limitation a mud turbine generator."

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The term "about" is meant to account for variations due to experimental error. The term "substantially" is meant to permit deviations from the descriptive term that don't negatively impact the intended purpose. All measurements or numbers are implicitly understood to be modified by the word about, even if the measurement or number is not explicitly modified by the word about. All descriptive terms are implicitly understood to be modified by the word substantially, even if the descriptive term is not explicitly modified by the word substantially.

The verbs "activate" and "fire" and "transmit" are used interchangeably and mean the same thing.

The terms "wellbore" and "borehole" are used interchangeably.

"Measurement While Drilling" ("MWD") can refer to devices for measuring downhole conditions including the location of the drilling assembly contemporaneously with the drilling of the well as well as insuring telemetry to surface. "Logging While Drilling" ("LWD") can refer to devices concentrating more on the measurement of formation parameters. While distinctions may exist between these terms, they are also often used interchangeably. Both terms are understood as related to the collection of downhole information generally, to include, for example, both the collection of information relating to the position of the drilling assembly and the collection of formation parameters.

The terms "connected" or "attached" or the like are understood to be modified by "directly or indirectly." In other words, if A is attached to B, it may be directly attached to B or indirectly attached to B through additional components.

Figure 1:
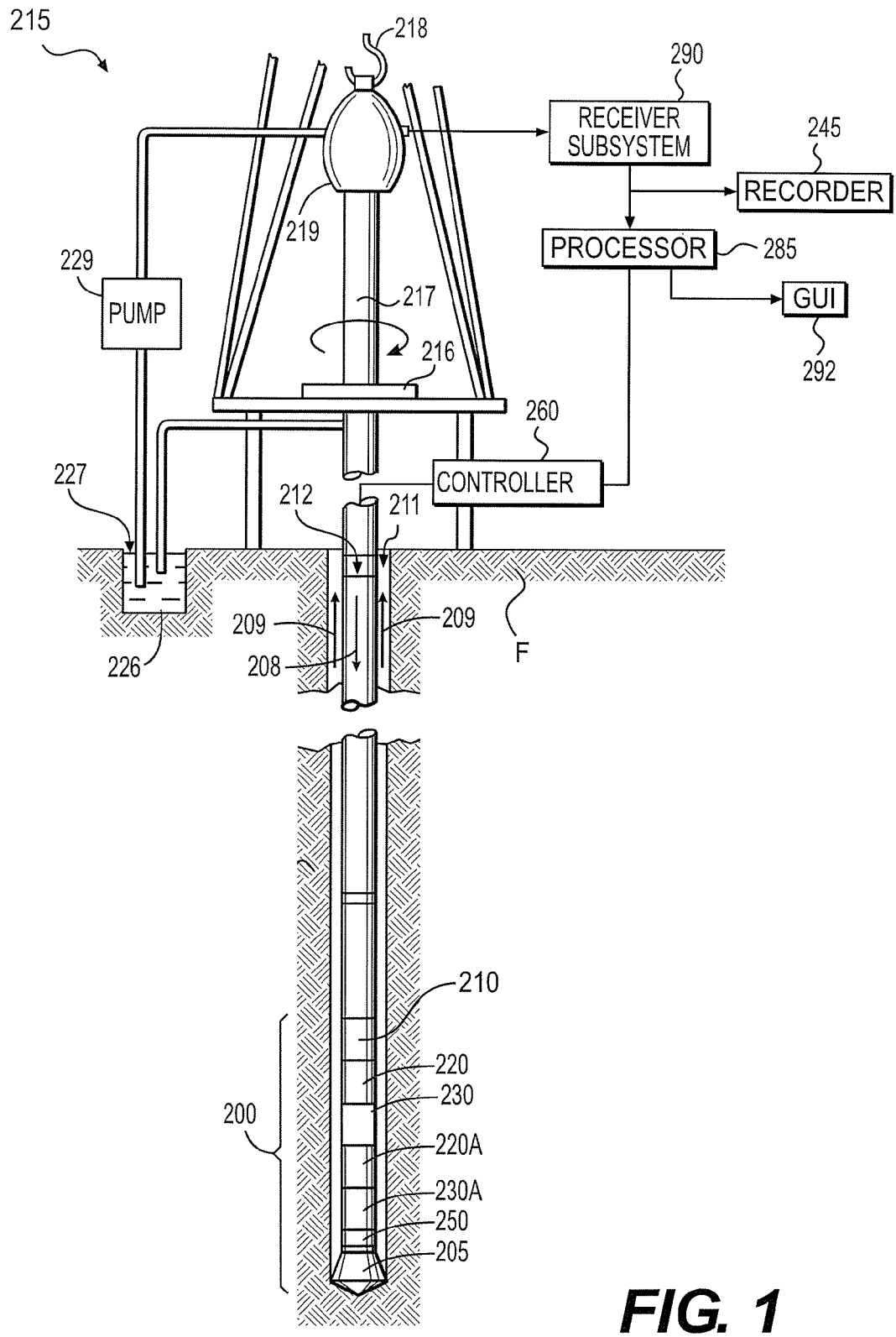
FIG. 1 is a partial schematic representation of an exemplary apparatus for measurement while drilling that is compatible with the devices, systems and methods of this disclosure.

FIG. 1 illustrates a non-limiting, exemplary well logging system used to obtain well data and other information, in which may be integrated the seismic vibrator devices and seismic acquisition systems in accordance with embodiments of the present disclosure.

FIG. 1 illustrates a land-based platform and derrick assembly (drilling rig) 215 and drill string 212 with a well logging data acquisition and logging system, positioned over a wellbore 211 for exploring a formation F. In the illustrated embodiment, the wellbore 211 is formed by rotary drilling. Those of ordinary skill in the art given the benefit of this disclosure will appreciate, however, that the subject matter of this disclosure also finds application in directional drilling applications as well as rotary drilling, and is not limited to land-based rigs.

A drill string 212 is suspended within the wellbore 211 and includes a drill bit 205 at its lower end. The drill string 212 is rotated by a rotary table 216, energized by means not shown, which engages a kelly 217 at the upper end of the drill string 212. The drill string 212 is suspended from a hook 218, attached to a travelling block (also not shown), through the kelly 217 and a rotary swivel 219 which permits rotation of the drill string 212 relative to the hook 218.

Drilling fluid or mud 226 is stored in a pit 227 formed at the well site. A pump 229 delivers the drilling fluid 226 to the interior of the drill string 212 via a port in the swivel 219, inducing the drilling fluid 226 to flow downwardly through the drill string 212 as indicated by the directional arrow 208. The drilling fluid 226 exits the drill string 212 via ports in the drill bit 205, and then circulates upwardly through the region between the outside of the drill string 212 and the wall of the wellbore, called the annulus, as indicated by the direction arrows 209. In this manner, the drilling fluid 226 lubricates the drill bit 205 and carries formation cuttings up to the surface as it is returned to the pit 227 for recirculation.

The drill string 212 further includes a bottom hole assembly ("BHA"), generally referred to as 200, near the drill bit 205 (for example, within several drill collar lengths from the drill bit). The BHA 200 includes capabilities for measuring, processing, and storing information, as well as communicating with the surface. The BHA 200 thus may include, among other things, one or more logging-while-drilling ("LWD") modules 220, 220A and/or one or more measuring-while-drilling ("MWD") modules 230, 230A. The BHA 200 may also include a roto-steerable system and motor 250.

The LWD and/or MWD modules 220, 220A, 230, 230A can be housed in a drill collar, and can contain one or more types of logging tools for investigating well drilling conditions or formation properties. The logging tools may provide capabilities for measuring, processing, and storing information, as well as for communication with surface equipment.

The BHA 200 may also include a surface/local communications subassembly 210, which may be configured to enable communication between the tools in the LWD and/or MWD modules 220, 220A, 230, 230A and processors at the earth's surface. For example, the subassembly 210 may include a telemetry system that includes an acoustic transmitter that generates an acoustic signal in the drilling fluid (a.k.a. "mud pulse") that is representative of measured downhole parameters. The acoustic signal is received at the surface by instrumentation that can convert the acoustic signals into electronic signals. For example, the generated acoustic signal may be received at the surface by transducers. The output of the transducers may be coupled to an uphole receiving system 290, which demodulates the transmitted signals. The output of the receiving system 290 may be coupled to a computer processor 285 and a recorder 245. The computer processor 285 may be coupled to a monitor, which employs graphical user interface ("GUI") 292 through which the measured downhole parameters and particular results derived therefrom are graphically or otherwise presented to the user. In some embodiments, the data is acquired real-time and communicated to the back-end portion of the data acquisition and logging system. In some embodiments, the well data may be acquired and recorded in the memory in downhole tools for later retrieval.

The LWD and MWD modules 220, 220A, 230, 230A may also include an apparatus for generating electrical power to the downhole system. Such a power generator may include, for example, a mud turbine generator powered by the flow of the drilling fluid, but other power and/or battery systems may be employed additionally or alternatively.

The well-site system is also shown to include an electronics subsystem having a controller 260 and a processor 285, which may optionally be the same processor used for analyzing logging data and which together with the controller 260 can serve multiple functions, in particular to trigger the start of seismic data acquisition via downlink command. For example, the controller 260 and processor 285 may be used to power and operate the logging tools such as the seismic investigation tool mentioned below. The controller and processor need not be on the surface as shown but may be configured in any suitable way. For example, alternatively, or in addition, the controller and/or processor may be part of the MWD (or LWD) modules or part of the drill string on which the seismic investigation tool or seismic sources or receivers are positioned or may be on-board the seismic tool itself.

In some embodiments of the devices, methods and systems according to this disclosure, the electronics subsystem (whether located on the surface or sub-surface on or within the tool or some combinations thereof) can include one or more of clock synchronization protocols, machine-readable instructions for data reduction in advance of transmission, and machine-readable instructions for analyzing the distance and orientation of one or more bed boundaries from data collected in response to seismic signals generated by seismic vibrators according to this disclosure.

The disclosure provides downhole seismic sources. In some embodiments, the downhole seismic sources are compatible with seismic-while-drilling ("SWD") systems, which may be associated with measurement-while-drilling ("MWD") systems. For example, the downhole seismic sources can be integrated into drill-string components, for example drill pipe or drill collars, and for example drill pipe or drill collars including the bottom hole assembly ("BHA"). In some embodiments, the downhole seismic sources are configured to generate a range of low frequency signals (a sweep wave) suitable for imaging around the drill-string and ahead of the drill bit, which may be useful in geosteering. In some embodiments, the downhole seismic sources produce signals ranging in frequency up to about 700 Hz, or ranging from about 5 Hz or from about 10 Hz up to about 700 Hz, or up to about 500 Hz, or up to about 400 Hz, or up to about 300 Hz, or up to about 250 Hz.

The disclosure also provides integrated downhole seismic systems including at least one downhole source and at least one downhole receiver. In some embodiments, the systems are configured to determine the distance and orientation of bed boundaries, including around the drill-string and ahead of the drill bit. In some embodiments, the systems are capable of imaging reflectors up to about 200 m or up to about 300 m or up to about 400 m or up to about 500 m from the source (penetration into the surrounding formation). In some embodiments, the systems further include an electronics subsystem having data processing capabilities for determining the distance and/or orientation of at least a portion of the reflectors (bed boundaries) near the seismic system, for example capable of determining a first or at least a first bed boundary closest to the source for every direction around and ahead of the source, or for example up to five bed boundaries closest to the seismic source for every direction around and ahead of the source. In some embodiments, the systems further include data processing capabilities for determining rock properties, such as seismic velocity (e.g., compression and/or shear velocities). In some embodiments, the systems further include a data management subsystem compatible with wired-drill-pipe as telemetry for transferring collected data to the surface. In some embodiments, the systems further include a data management subsystem compatible with drill string including MWD as telemetry to surface.

The disclosure also provides methods for downhole seismic, including single well and cross-well seismic. In some embodiments, the methods include obtaining seismic information around the drill-string and ahead of the drill bit, for example up to about 200 m or up to about 300 m or up to about 400 m or up to about 500 m in depth.

Seismic Source.

The seismic vibrator is based on extendable and retractable pad designs ("moveable pads"). In general, the seismic vibrator can be integrated into a tubular compatible with the drill string, for example the drill pipe or drill collar and can include some moveable (articulating) pads integrated into the tubular, where the moveable (articulating) pads are sized to extend against the borehole wall. In some embodiments, the vibrator is integrated into a sleeve and includes some moveable (articulating) pads integrated into that sleeve: the sleeve is mounted as "free rotating" around the main system tubular connected to the drill string. Such construction allows the vibrator sleeve (and moveable pads) to stay static when the drill string rotates.

In operation, the pads are extended to contact the borehole wall and force is then applied to the pads to compress the wall. When the pushed force is modulated, a seismic wave can then be transmitted into the formation surrounding the borehole. The modulated force can be considered as the superposition of a constant compression force and an "alternating" or "modulated" force. The second component (the modulated force) may generate the seismic signal. In some embodiments, the force applied onto the pads is radial. In some embodiments, the force applied onto the pads should not create reaction on the tubular. Thus, in some embodiments, all the pads act in phase so that the overall seismic force amplitude is the sum of the individual pad forces. In some embodiments, the modulated force has a frequency bandwith within about 5 to about 500 Hz and an amplitude ranging from about 1000 to about 60,000 Newtons. The force output may be achieved over a wide range of frequencies as mentioned previously. In some implementations, the force output may be of nearly constant amplitude for each frequency in the desired range, up to about 700 Hz (potentially including harmonic signals), or ranging from about 5 Hz or from about 10 Hz up to about 700 Hz, or up to about 500 Hz, or up to about 400 Hz, or up to about 300 Hz, or up to about 250 Hz.

With such force output versus frequency bandwidth, the wavelet after cross-correlation can be quite narrow and of high amplitude, allowing high resolution of seismic images (after correlation) and also allowing separation of reflectors of limited distance. Generally, the larger the bandwith (number of octaves) the greater the quality of correlation wavelet (narrow, high center lobe amplitude, and low amplitude for side lobe), where the central frequency defines the resolution and capability to recognize adjacent reflectors while the large amplitude-low frequency enables stabilization of the correlation process.

Figure 2:
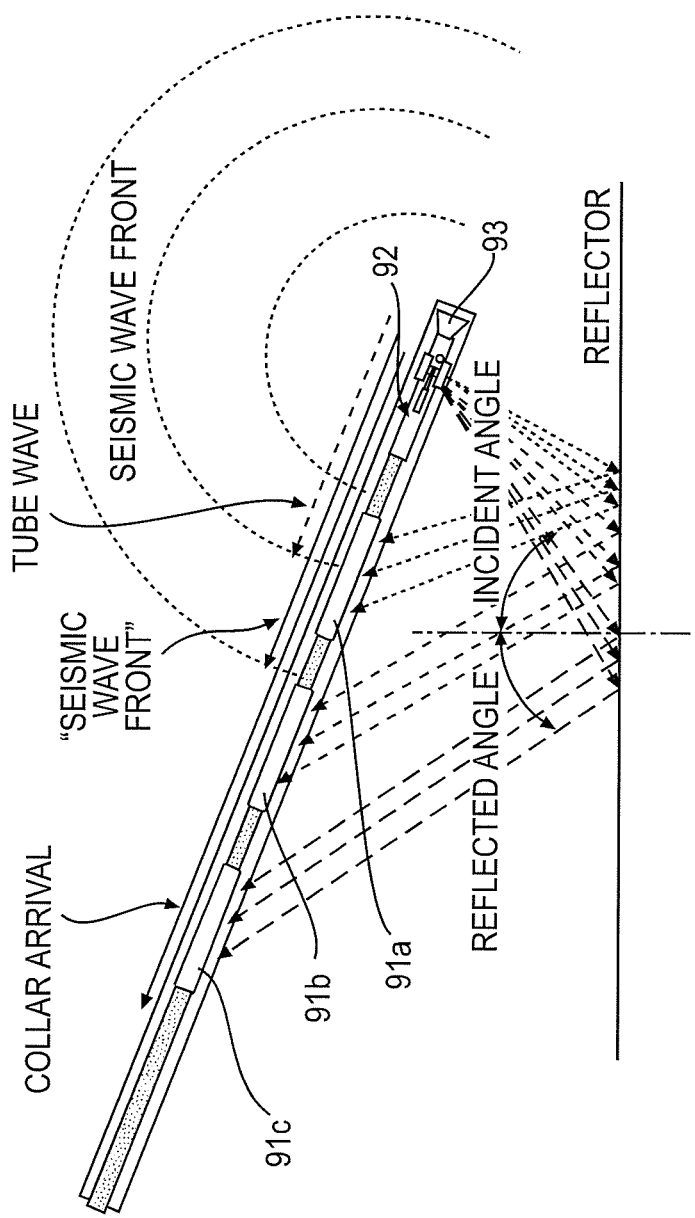
FIG. 2 is a schematic illustration of an embodiment of a single well seismic investigation system in accordance with the present disclosure, as well as seismic ray paths from source via reflectors (bed boundaries) to receivers.

FIG. 2 illustrates an example use of a downhole seismic source with receiver in the same borehole. The source 92 is installed in the BHA relatively close to the bit 93. Several seismic receivers 91a, 91b, 91c are installed in the same BHA at relatively regular distance from one another. The source 92 can be positioned at the low side of the drill-string, while one or more receivers can be installed above the source. The figure indicates the seismic ray paths from the source 92 to various earth interfaces acting as reflectors and reflecting signal towards the receivers 91a, 91b, 91c.

Figure 3:
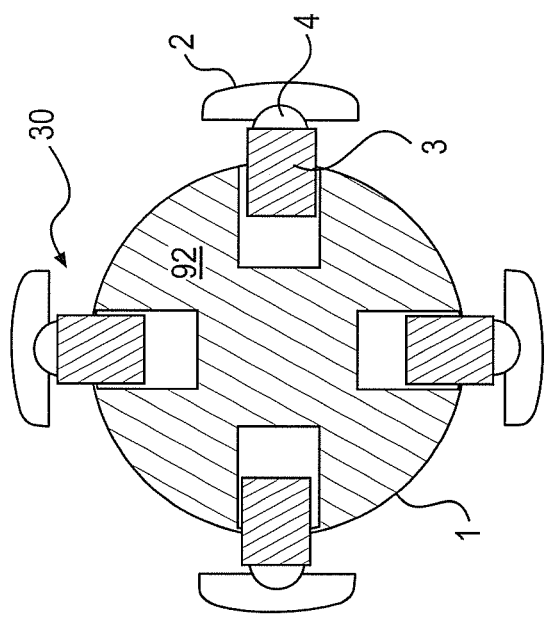
FIG. 3 is a cross-sectional top-view schematic illustration of an embodiment of a seismic vibrator according to this disclosure.

FIG. 3 is a top-view, cross-section, schematic illustration of an embodiment of a seismic vibrator 92 (also referred to as a seismic source) suitable for use downhole. As shown, the seismic vibrator 92 includes four moveable members 30 (also called 'force generating members' or 'articulating members') co-located in an axis-symmetric pattern within a drill collar 1 of a MWD system. In other words, the movable members 30 are located at the same axial position and are uniformly distributed about the circumference of the drill collar 1 (the distribution could be at 120 degree offset).

The moveable members 30 include a contact pad 2, push system 3 (a piston in the instant example), and a ball joint 4. The contact pad 2 can be pushed radially by a mechanical activation system such as piston 3. Ball joint 4 provides tiltable or pivotable coupling of the contact pad 2 to the piston 3 so that the contact pad 2 can have desirable, and in some embodiments, optimum, contact with wellbore wall (not shown). Such configurations may limit the local contact stress as the push pad 2 is laid against the wellbore, in a manner that may avoid damage in the rock (including rock failure), as well as insure seismic signal transmission in the linear range of the rock behavior, resulting in limited non-linearity and generation of harmonics.

The moveable g members 30 can be integrated into the drill collar 1 by any suitable means. Similarly the moveable members 30 may be actuated between a retracted position and an extended position by any suitable actuating device. For example, the moveable members 30 may be hydraulically actuated by a hydraulic control system within the interior of the drill collar 1. A control valve 10, described in more detail below, and which may form part of the hydraulic control system, is shown in the center of the drill collar 1 (see, e.g., FIGS. 6-8, 11, 14).

Although in the illustrated embodiment, the contact pads 2 with the associated push system or piston 3 are retractably attached to the drill collar 1 (retractably integrated into the drill collar 1), they may in fact be retractably attached anywhere along the drill string, and for example they may be retractably attached to any tubular housing along the drill string. The retracting effect (or push back) can also be performed by contact with the wellbore when the collar moves in the wellbore. In such an embodiment, the contact pads 2 may have large chamfers (not shown) on the edges. Example of suitable means for retractably attaching pistons along a tube collar can be found in a "push-the-bit" Rotary Steerable System such as the Schlumberger PowerDrive™ device or in LWD systems designed to measure formation pressure such as the Schlumberger STETOSCOPE™ system.

In some embodiments, the contact pads 2 with push systems 3 are not co-located (they are not all at the same axial position) and one or more of the moveable members 30 may be offset from other moveable members 30. However, positioning moveable members 30 at the same axial position may minimize the generation of force and bending in the tubular, limiting parasitic excitations of movement in the tubular. In some embodiments where there is some axial offset between moveable members 30, parasitic movement can be taken into account for signal reception and decoding. In such system embodiments, the receiving sub can be equipped with axially distributed sensors (accelerometers or geophones) to detect the propagation of bending waves induced by the push forces with axial offset at the source, and to allow suppression of this parasitic signal out of seismic information via specific processing.

In one source embodiment, the bending of the source collar may also induce parasitic contact with wellbore and induce seismic signal in the formation surrounding the wellbore. To insure stable emission of this secondary effect, stabilizers (not shown) can be installed above and below the set of pads 2. Also, the pad force may be positive in the whole transmission cycle forcing the pads 2 and stabilizers to keep steady contact with the borehole and avoiding local impact during the cycle when these elements could become loose followed by sudden contact with the borehole wall.

In some embodiments, there are two, three or four or more moveable members 30. The moveable members 30 can be distributed in an axis-symmetric pattern (uniformly) about the tubular. For example, FIG. 4 is a schematic illustration of an embodiment of a seismic vibrator, which has four moveable members 30 distributed around a tubular 1 with a 90 degree offset.

Figure 4:
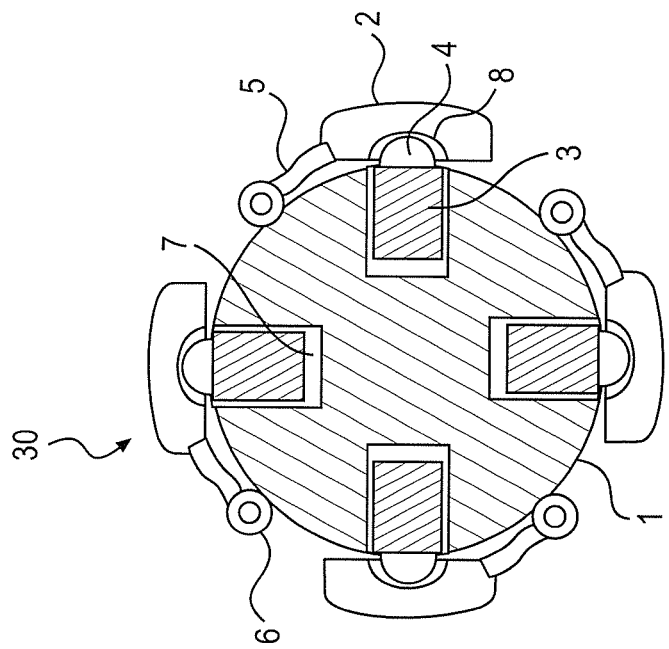
FIG. 4 is a cross-sectional top-view schematic illustration of an embodiment of a seismic vibrator according to this disclosure, including single hinge pad guidance.
Figure 5:
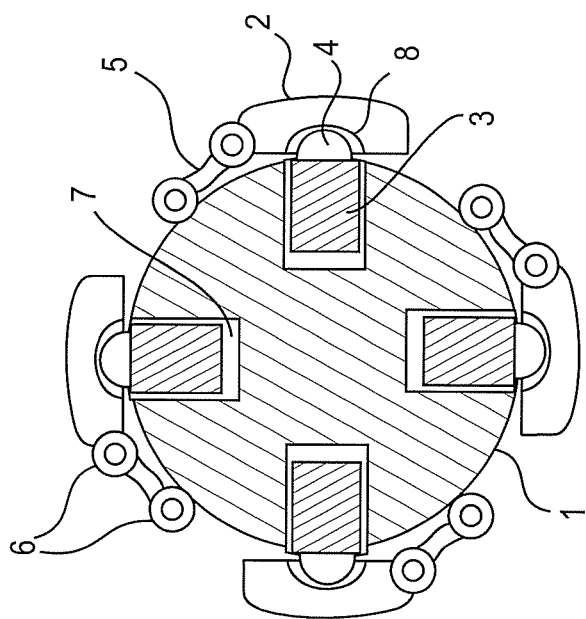
FIG. 5 is a cross-sectional top-view schematic illustration of an embodiment of a seismic vibrator according to this disclosure, including double hinge pad guidance.

FIGS. 4 and 5 are top-view, cross-sectional illustrations of embodiments of seismic vibrators that provide "mechanical freedom" to contact pads 2, for example to achieve desired contact with the wellbore wall. As shown, the force generation system includes movable pads 2, which pads are actuated with push pistons 3, and are attached to the collar 1 via a flexible hinge assembly comprising a flexible member (or 'articulated linkage') 5 and one or more joint hinges 6. The flexible member 5 (and hence the flexible hinge assembly) can oscillate. The contact surface 8 between the force generation system 3 and the pad 2 may accommodate for tangential displacement of the pad while moving outwards. This tangent displacement is due to the hinge attachment 6 and linkage 5. In some embodiments, the contact surface 8 in the pad 2 has a larger radius of curvature than the contact 4 of the piston 3.

Regarding the joint hinges 6, this component restrains the pad 2 to the collar 1, reducing the chance of losing the pads 2 in the wellbore during the drilling actions. Whereas the embodiment of FIG. 4 is based on a single hinge approach, the embodiment of FIG. 5 includes a double hinge system. A double hinge system may improve the contact between the pad 2 and the borehole wall as compared to the single hinge system; in the double-hinge system the pad 2 may rely on the whole surface of contact to transmit the force rather than only the edge of the pad 2 (opposite to the hinge). In either case, the flexible (potentially oscillating) hinge joint assembly may allow the pad 2 to be slightly inclined versus the collar axis, thereby enabling the pad 2 to be in contact with the borehole wall over a greater surface area of the pad 2, and potentially the whole surface of the pad 2, than otherwise. Such an arrangement may have the advantage of facilitating transmission of the push force to the formation even when the collar is not in the center of the hole, or even if the hole is not fully circular and even if the hole is locally slightly conical.

FIGS. 6, 7, 8 and 11, 14 are schematic illustrations of hydraulic-based control systems for generating a push force against the pads 2. For example, the push force can be generated via the application of fluid in the cavity 7 of the tubular 1 acting against the internal surface of the piston 3. The control of this pressure enables the proper selection of the push force against the borehole. In some embodiments, the seismic vibrator is a "monopole source" with all the contact pads 2 extending in phase with force of same amplitude, resulting in a quasi-spherical shaped wave as the transmitted wavelength is quite larger than the borehole diameter (e.g., more than 10 fold: typically the borehole diameter is less than about 0.25 meter while the wavelength typically ranges from about 10 to about 300 meters for frequencies between about 300 and about 10 Hz).

Figure 6:
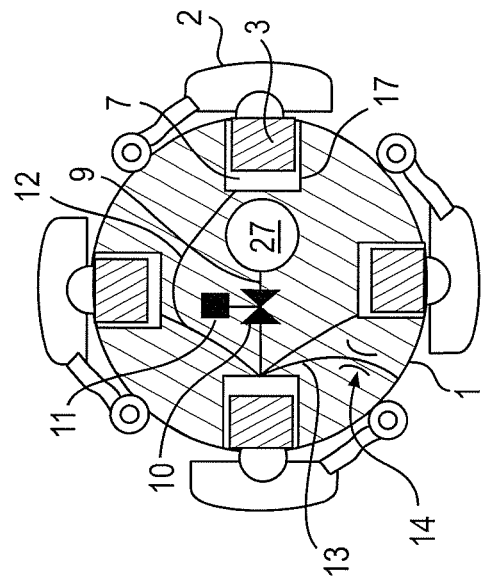
FIG. 6 is a schematic illustration of an embodiment of a hydraulic-based pressure control system for articulating push pads of seismic vibrators according to this disclosure, where the pressure control is performed by a supply of fluid.

Referring to FIG. 6, the pressure applied onto the force generation devices 3 (in this case pistons) can be directly derived from the difference of pressure across the tubular (e.g., the drill collar) 1, which in some embodiments is present during drilling, as the mud flow passes through the bit nozzle. Stated otherwise, the pressure in the mud channel at the bottom of the drill string can be several hundred psi higher than the pressure around it (for example on the order of about 800 psi or greater). This pressure differential may be exploited, for example, together with a valve system to create force to actuate the pistons 3.

FIG. 6 illustrates an embodiment of a valve system for creating force to actuate the pistons 3. As shown, a valve 10 can be used to control the application of pressure onto the pistons 3. A motor 11 operates the valve 10 to feed fluid from an internal flow channel 27 to the cavities 7 via the channel 9 and the manifold 12. The fluid provided by the valve 10 acts on the pistons 3, while continuously escaping to the annulus via the exhaust channel 13 where pressure drop is generated via the nozzle 14. With such design, the push force will return to zero when the valve 10 is closed, as the pressure is bled via the exhaust nozzle 14. The pressure in the cavities 7 relates to the degree of opening of the valve 10, where the larger the opening, the higher the pressure in the cavities 7, as this pressure is approximately obtained as a relation of the pressure-drop in the valve 10 and in the choke 14, as follows:

$$P_{inside} - P_{annulus} = (P_{inside} - P_{cavity7}) + (P_{cavity7} - P_{annulus}) =$$
$$\text{Delta pressure}_{Valve10} + \text{Delta pressure}_{Choke14}$$

where $P_{annulus}$=pressure outside the tubular 1.

With a larger opening of the valve 10, the pressure in the valve 10 is reduced while allowing a larger flow through the valve 10. Some of this flow fills the cavities 7 pushing the pistons 3 outwards while the rest of the flow escapes to the annulus via the choke 14. As the flow through the choke 14 increases, the pressure drop across the choke 14 also increases following the approximated formula:

$$P_{choke} = K\rho Q_{choke}^2$$

with:

$P_{choke}$=delta pressure across the choke,
K=coefficient depending on choke design,
$\rho$=density of the fluid passing across the choke,
$Q_{choke}$=flow rate across the choke.

It should be noted that during the vibrator transmission period of seismic signal, the pad 2 stays in contact with the wellbore. This effect minimizes the movement of the piston 3, so that a portion of flow fed through the valve 10 acting to push the piston 3 forward is also minimized: the movement of the piston 3 should be related only to the compressibility of the borehole wall. As the piston movement is small, the sinusoidal pressure effect on the pistons 3 can be obtained by proper flow control due to the opening of the valve 10 to create the proper pressure effect as a results of two pressure drops (in the valve 10 itself and across the choke 14).

According to the embodiment of FIG. 6, the contact pads 2 act in phase and therefore the modulated force is the sum of the force from each contact pad 2.

In some embodiments, the exhaust channels 13 and exhaust choke 14 may also be provided inside the pistons 3 or even as a clearance between a piston 3 and the bore 17.

Figure 7:
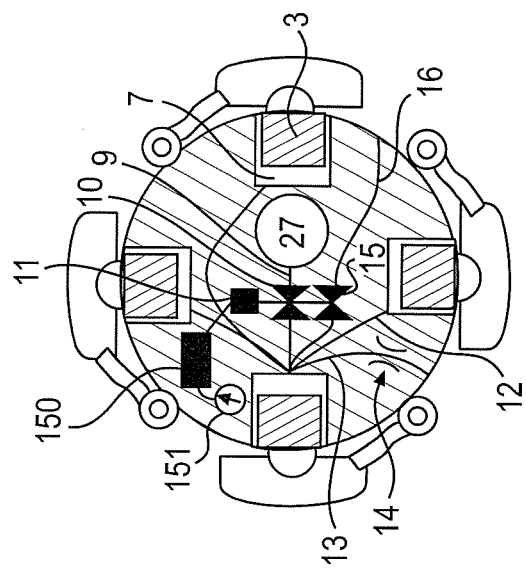
FIG. 7 is a schematic illustration of an embodiment of a hydraulic-based pressure control system for articulating push pads of seismic vibrators according to this disclosure, where the pressure control is performed by a supply and exhaust of fluid.

FIG. 7 illustrates an embodiment of a valve system for controlling pressure to the pistons 3, e.g., inside the cavities 7. In the embodiment of FIG. 7, the valve system includes an additional valve 15, which provides a connection to fluid outside of the tubular 1 via a channel 16. The valve 15 can be operated by a motor, such as motor 11, whose operation is out of phase in comparison with supply valve 10. In some embodiments, a three-way valve is used, where the three-way valve may connect a cavity 7 to the internal flow channel (supply of pressure) 27 via supply line 9, or it may connect the cavity 7 to the exterior of the tubular 1 via a discharge line 16. The cavity 7 may also be connected to the three-way valve by line 13. In some embodiments, further pressure control may be achieved by using two independent motors to operate the valves 10, 15.

Figure 8:
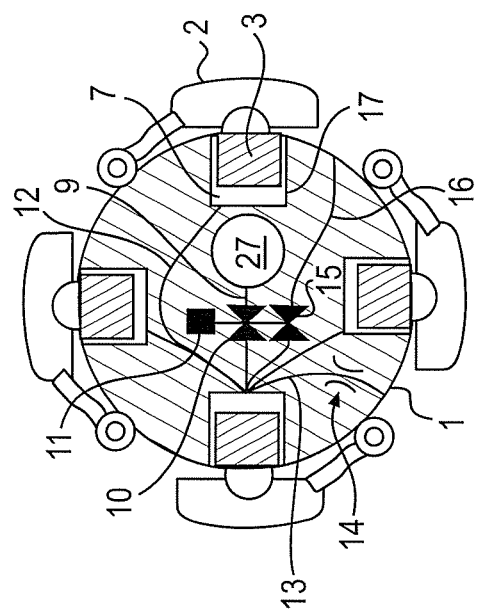
FIG. 8 is a schematic illustration of an embodiment of a hydraulic-based pressure control system for articulating push pads of seismic vibrators according to this disclosure, including a feedback control between push pressure and control valve position.

As further shown in FIG. 8, in some embodiments, a control unit 150 controls the position of the valves 10, 15 via the motor 11 to generate a sinusoidal variation in the pressure in the cavity 7 versus time. A pressure sensor 151 can be added so that the control unit 150 can measure the pressure in the cavity 7 and adjust the valve setting for improving the pressure control. In other words, in some embodiments, the seismic vibrator pressure control system includes a feedback control system, which measures pressure with a gauge 151 and uses electronics (not shown) to manage the pressure wave to maintain a sinusoidal wave. In some embodiments, this may be accomplished by comparing the measured pressure to a reference signal and opening or closing the valve the amount needed to adjust the measured signal to match the reference signal. In some embodiments, the reference signal is a sweep wave including a range of frequencies, for example from low to high, and not a single frequency.

In some embodiments, the valves 10 and 15 may be operated by 2 independent motors for more accurate control of the pressure applied onto the pistons 3 so that the force output is maintained close to the reference signal.

Figure 9:
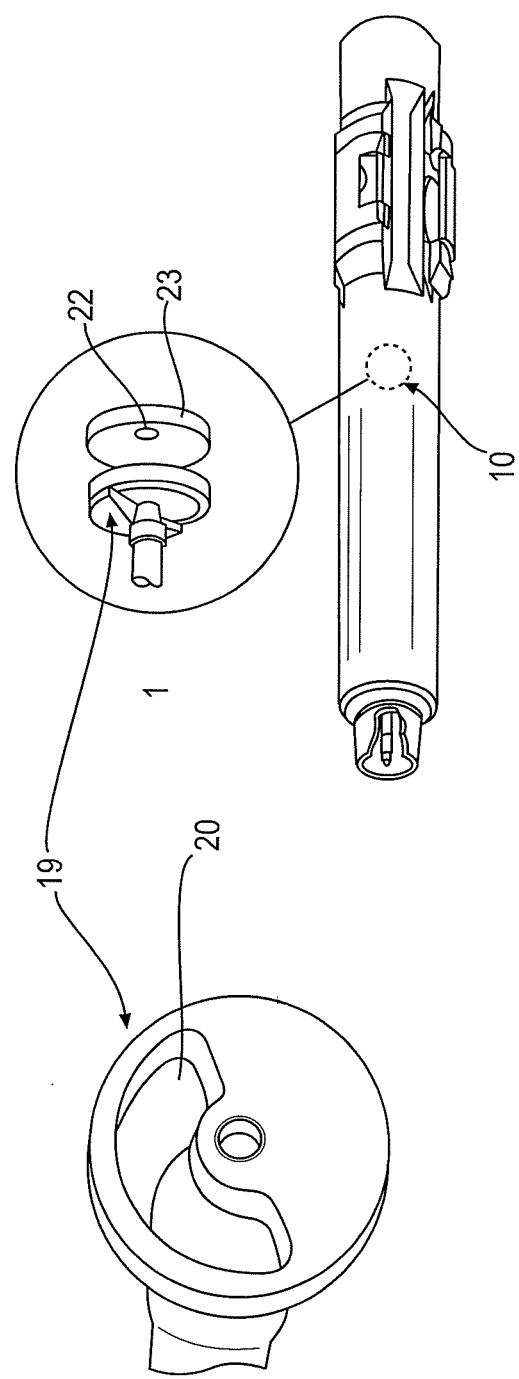
FIG. 9 is a schematic illustration of a valve suitable for use with embodiments of seismic vibrator pressure control systems.

FIG. 9 is a schematic illustration of a valve suitable for use with embodiments of the seismic vibrator pressure control system. As shown in FIG. 9, the valve 10 includes a rotor 19, and a static element ("stator") 23. The rotor 19 includes a shaped window 20 whereas the stator 23 includes a fixed hole 22. Fluid in the internal mud channel flows through the valve 10 when the shaped passage 20 overlaps the fixed hole 22 and into the cavities 7 through one or more supply lines, such as for example, supply line 12. The control unit 150 can position the valve 10 setting from a fully closed position to a partially or fully open position so that fluid is fed at different rates into the cavities 7. By proper management of the pressure drop in the valve 10 and the nozzle 14 (as well as across the optional discharge valve 15), the control unit 150 can create pressure in the cavity 7 to set the push force of the contact pads 2.

Figure 10:
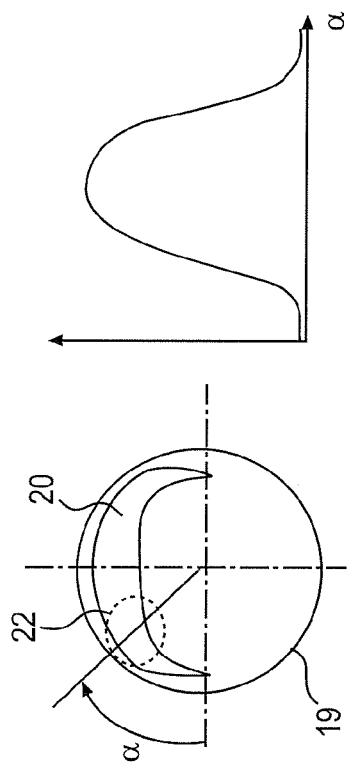
FIG. 10 is a stylized graph illustrating the effect of valve opening shape on fluid pressure due to operation of a rotor-stator valve.

As shown in FIG. 10, the valve rotor window 20 has a shape varying with the angle α so that the shape of the passage formed by the overlap of the shaped window 20 with the fixed hole 22 varies as shown in the accompanying graph. In some embodiments, the shape of the opening formed by the overlap of the shaped window 20 and the fixed hole 22 is chosen to vary with angular position such that the push force on the contact pad 2 is an approximation of a sine wave. Although a fixed hole 22 is shown on the stator 23, the rotor 19 and stator 23 may independently have any shaped cut-outs such that the shape of the passageway formed as the rotor 19 rotates, forming an opening through which fluid may flow, results in a desired contact pad push force profile.

With the described valve of FIG. 9, one pressure cycle is generated for each valve rotation because the valve window 20 covers 180 degrees of the valve rotor 19. In some embodiments, "N" pressure cycles are obtained per revolution by constructing a valve that covers 360 degrees/(2×N), and providing N fixed holes in the stator 23 at angle 360/N degrees, where the N fixed openings are interconnected in order to feed fluid pressure into all the pads. For example, if N=3, 3 pressure cycles can be obtained per valve rotation, enabling generation of higher signal frequency while maintaining the valve rotation speed at low value.

Without wishing to be bound by theory, in general, the frequency of the modulated force depends on the rotational speed of the valve(s) and the valve construction. The force amplitude is primarily controlled by the difference of pressure across the collar and the surface of the push piston. The purity of the sine wave (no harmonic) is defined by the linearity of the pressure. In some embodiments, the valve shaft can rotate up to about 3600 RPM, which corresponds to about 60 Hz rotation. With three pressure cycles per turn, the frequency of pressure fluctuation may be up to about 180 Hz. In some embodiments, where the motor 11 approximately outputs 1 kilowatt, the system would able to operate to about 250 Hz.

Higher frequency contained in the seismic signal could be obtained from the harmonic distortion of the base signal. In such a case, the cross-correlation includes the whole frequency spectrum, not only the theoretical content. For such input to cross-correlation, the transmitted signal should be measured: this can be obtained via accelerometers (41 in FIG. 15) on the pad 2 or pressure gauge 151 to determine the real transmitted signal, so as to include signal up to about 500 Hz if the second harmonic is included or even up to about 750 Hz if the third harmonic is included.

In some embodiments, poppet valve or needle valve can be used for valve 10 and/or 15. Such valve may be associated with linear actuator or by rotary actuator acting via push cam. As the fluid to control is "drilling mud," the valve element may be constructed out of PDC material to be wear resistant.

Figure 11:
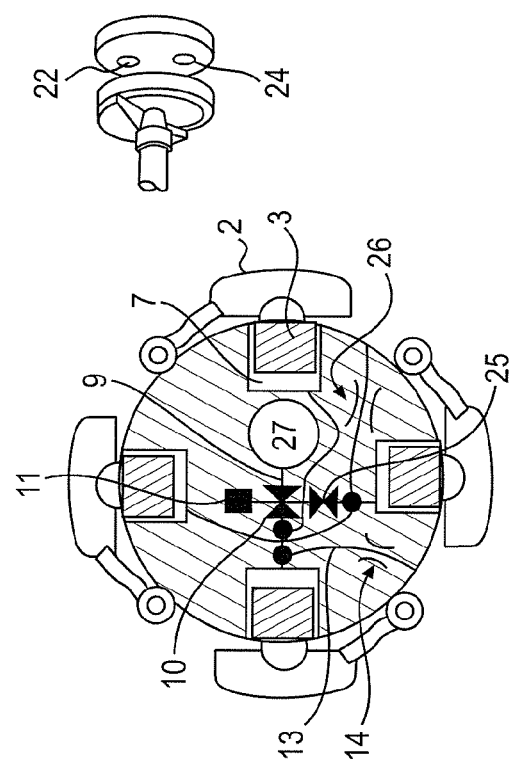
FIG. 11 is a schematic illustration of an embodiment of a hydraulic-based pressure control system for articulating push pads of seismic vibrators according to this disclosure, where two pairs of pads are acting asynchronously.
Figure 12:
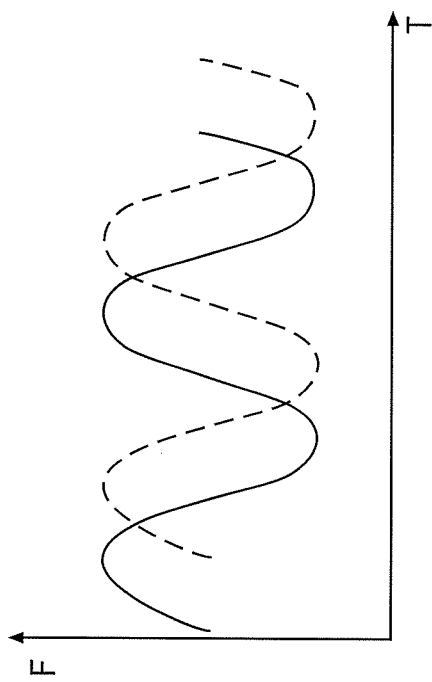
FIG. 12 is a graph illustrating force output for direction for the seismic vibrator of FIG. 11.

In some embodiments, where there is an even number of pads 2, such as shown in FIG. 11, the pads 2 can be grouped in pairs (i.e., pairs of pads are 180 degrees apart). In the embodiment of FIG. 11, the valve system may be modified so that the pairs of pads 2 are activated at a 90 degree phase difference. When the pads 2 on one axis are pushed out, the pads 2 along the other axis are released. The valve system is a combination of two valves 10, 25 operated with a 90 degree phase difference. Each pairs of pads has its own flow release nozzle 14, 26. In some embodiments, the two valves 10, 25 are operated by the same motor 11. In some embodiments, the two valves 10, 25 are operated by independent motors. In embodiments with two motors, the pairs of pads may be operated either synchronously or asynchronously. In some embodiments, the exhaust fluid can pass through control valve, e.g., valve 15 of FIG. 7: in this case, two exhaust valves can be used for each independent pair of pads. Each of the exhaust valves can be driven by the same motor of the supply valve (e.g., either 10 or 25 of FIG. 11). In some embodiments, each valve can be driven by its own motor: when 2 exhaust valves and 2 supply valves (e.g., 10 and 25) are being used, a total of 4 motors may be used. With such independent valve control, each pair of pads can deliver proper sinusoidal output for all frequencies and for most applications. In some embodiments, the valve is configured as shown, with two discharge ports 22, 24 positioned 180 degrees apart. Such embodiments may be configured to result in each pair of pads generating a sinusoidal force oriented geometrically at 90 degrees from each other. The forces also have a 90 degree phase shift in the time domain as illustrated in FIG. 12. Other phase differences between the excitations of the 2 pairs of pads can be considered for specific usage.

Figure 13:
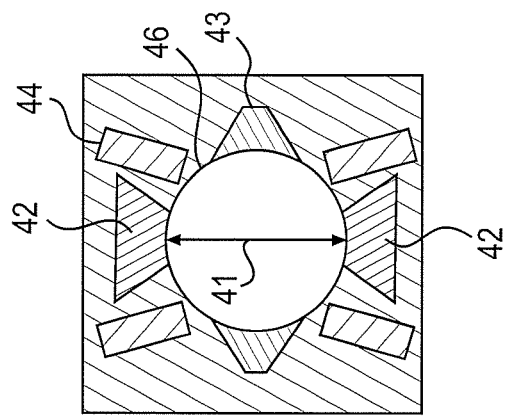
FIG. 13 is a stylized illustration of stresses generated in near wellbore from operation of the seismic vibrator of FIG. 11.

As shown in FIG. 13, the source of FIG. 11 may also generate S-waves in the earth medium surrounding the seismic vibrator. Specifically, when a pair of pads 2 creates a force 41 against the borehole 46, two zones 42 of compression stress appear in the vicinity of the activated pads 2 and at the right angle diameter, two zones 43 of tensile stress appear. Between these regions, four zones 44 of shear stress are also created. It should be noted that the stress amplitude is not constant across these zones. In an ideal case, the shear planes in all of zones 44 would be as parallel as possible. The generated shear stress propagates in the earth and induces reflection at interface in the surrounding formations. If the receiver subs are equipped with proper transducers, the reflected shear waves can be detected, enabling the creation of a seismic image based on shear wave propagation and reflection; such images contain additional information about the medium crossed by the waves such as anisotropy of the formation. In an embodiment shown in FIG. 14, shear generation can also be achieved with a system having only one pair of active pads 2. In some embodiments, a valve 10 can be installed in the exhaust line 13 in a similar way as the valve 15 of FIG. 7. Shear can be generated in both major planes of transmission by rotating the device 90 degrees between sweeps.

Figure 15:
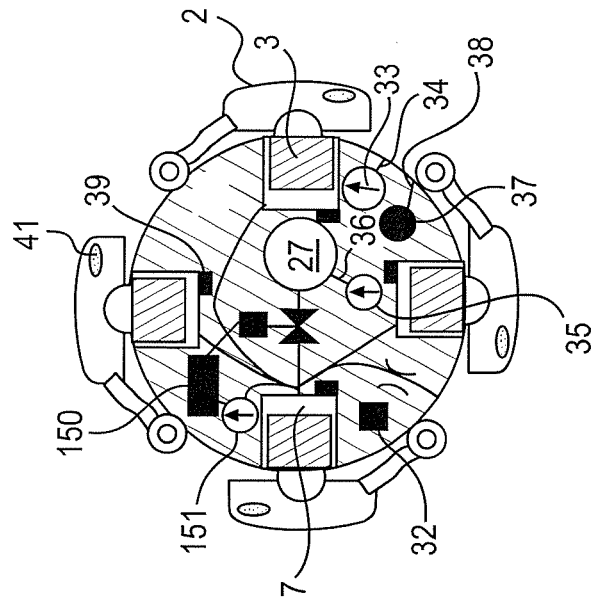
FIG. 15 is a schematic illustration of an embodiment of a seismic vibrator according to this disclosure, including instrumentations associated with vibrator operation.
Figure 14:
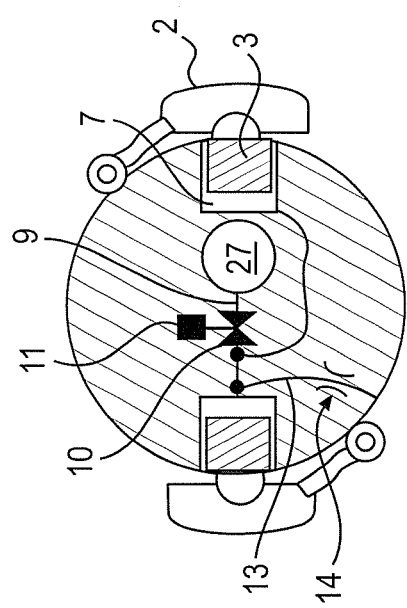
FIG. 14 is a cross-sectional top-view schematic illustration of an embodiment of a seismic vibrator according to this disclosure, capable of generating non-spherical seismic signal around a wellbore.

In an embodiment illustrated in FIG. 15, the seismic vibrator includes additional instrumentation directed at determination of signal and noise generated during transmission. For example:

Pressure sensor 151 measures the pressure applied to pistons 3, facilitating proper determination of push force variation versus time.

Pressure sensor 35, which is connected to the internal flow line 27 via the connection line 36, measures the reference internal flow pressure (i.e., the reference supply pressure) and thereby monitoring change in the supply pressure. In some embodiments, where pressure sensor 35 is a hydrophone, the effect of vibrator modulation on certain parasitic noise can be determined Vibrator modulation generates some by-pass flow directly to the annulus via the valve system; this means that the flow through the drill-bit nozzle is modulated so that the pressure in the channel 27 is also modulated with small amplitude. This fluid pressure modulation generates tube wave in the annulus, as well as in the flow channel 27.

The pressure sensor 33 is connected to the fluid in the wellbore annulus via the connection line 34. This pressure gauge 33 facilitates determination of the back pressure onto the pistons 3 and therefore determination of the absolute push force on the pads 2 via the piston 3.

A hydrophone 37 is connected to the fluid in the wellbore annulus via a connection line 38. This sensor 37 facilitates determination of the near-field acoustic signal, which may enable determination of the seismic amplitude transmitted in the surrounding medium, as well as the receiving seismic signal with "zero offset" from the source.

Accelerometers 41 are mounted onto the pads 2 to determine the signal transmitted to the formation. This acceleration depends on the push force and the seismic impedance of the formation (the formation rigidity). In some embodiments, a 1-C accelerometer may be sufficient to measure the radial movement (via the displacement sensor 39). The measurement of pad acceleration allows correction of the determination of the delivered push force by the vibrator, including effect of the formation elastic deformation.

The accelerometer (geophone) 32 is mounted onto the body 1 to determine the acoustic noise into the tubular. With a 2-C accelerometer (radial and axial movement), it is possible to characterize the noise transmitted into the tubular, so that a digital filter would permit attenuation of this noise from the measurement performed at the receiving station. With a 3-C accelerometer (or the 2 radial components), it is possible to determine if some push pads are not properly in contact with the wellbore, as the collar would be subjected to radial acceleration.

Displacement sensors 39 facilitate determination of the position of the pistons 3 (pad opening). In some embodiments, the displacement sensors 39 can be used to insure that the pistons 3 are not fully extended so that they cannot transmit force into the formation. The displacement sensors 39 could be placed to monitor directly the position of the pads 2. The sensor output is a good complement to the output of the accelerometer 41. Furthermore, it gives information of full pad extension and false signal (force) output to the formation when working in enlarged borehole.

Pressure sensor 151 can be associated with a hydrophone for improved dynamic pressure measurement.

In each case, in some embodiments, the output of these sensors can be connected to the control unit 150 in order to optimize the control of the valve (e.g., force amplitude, minimum harmonic, etc.), as well as the exhaust valve if being installed in the vibrator.

Figure 16:
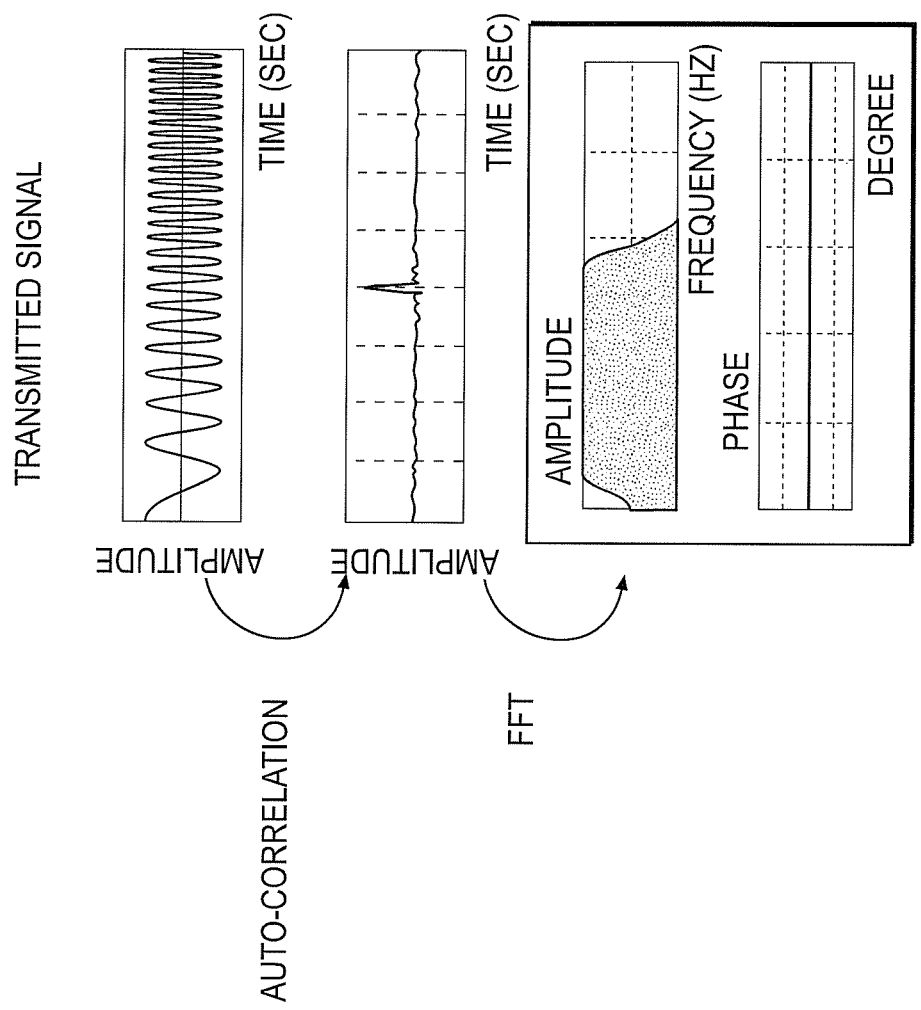
FIG. 16 is a graph illustrating signal coding consistent with this disclosure, while frequency sweep is being performed.

As previously discussed, the exemplified seismic vibrators can be configured to generate sinusoidal force in the earth with properly designed valve control, including having a sine wave which changes in frequency between a low value and a high value versus the transmission time (FIG. 16). Other sweeps may also be performed, again relating to the design of the valve control. The resulting transmitted signal may be auto-correlated to itself to obtain the characteristic auto-correlation wavelet which is equivalent to an "impulse" of the transmitted signal which has a quasi-constant amplitude and phase over the frequency bandwidth (FFT results, as shown in FIG. 16). Limiting harmonic generation may improve signal quality. Harmonic signals can be within the bandwidth of interest: then the correlation with reflected signal may be perturbed, thereby reducing the quality of the seismic image.

Figure 17:
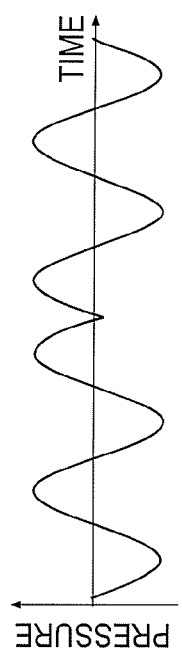
FIG. 17 is a graph illustrating an embodiment of signal coding consistent with this disclosure, while phase shift is being used as a coding method.

In some embodiments, seismic vibrators according to this disclosure due to their low inertia (for example because they have low pad weight and limited pad movement), may also or alternatively be configured to code the signal via phase-shift (FIG. 17). Such a coding may have the advantage of reducing the parasitic effect of harmonic. However it may be limited in frequency bandwidth corresponding to a limited ability to separate reflectors if they are too close to each other.

The systems described herein may have one or more of the following advantages:

Large push force against the formation, generated by fluid hydraulic;

Compliance to low rigidity formation;

Self adaptation to over-gauge hole;

Control system;

The by-pass flow is limited so that the flow fluctuation across the bit nozzle is limited (This means the internal pressure fluctuation is limited, so that parasitic noise modulation is small);

The system can be adapted to existing technology used in Rotary Stererable System such as SCHLUMBERGER's PowerDrive™ valve;

There is no or limited excitation in the tubular system (drill string), and limited system resonance and non-linearity;

Minimum or no noise generation in the tubular as the pads are acting in radial and axis-symmetrical ways;

There is no or limited force between the tubular and the borehole wall (for example as opposed to a vibrator with only one pad, which may result in the tubular being pushed against the other side of the borehole resulting in contact force being distributed over some length, inducing smearing of the signal transmitted at the contact and reducing spatial resolution);

The source can be located at one point in the wellbore;
Systems.

The disclosure also provides integrated downhole seismic investigation systems based on sources described herein. The systems include at least one source, one or more receivers, and an electronics subsystem for data management and/or clock synchronization among the one or more receivers.

In some embodiments, the source(s) and receiver(s) are both located downhole in a single well ("single well seismic system"). In some embodiments, the single well seismic system is configured to fit in a tubular system lowered into a wellbore. For example, a source and related array of receivers are installed in drill string lowered into a wellbore. In some embodiments, the single well seismic system is configured for integration into a bottom hole assembly (BHA) and, for example, the lower end of the BHA. In some embodiments, the source(s) and receiver(s) are both located downhole but are deployed in different wells ("cross-well seismic system"). Although only a single well system is described herein, a person of skill upon reading this disclosure would be able to implement the seismic system across two wellbores. For example, a person of ordinary skill would understand that the transmission sub could be deployed in one wellbore, while the array of receiver subs could be deployed in another wellbore. Or for example, a person of skill would understand that while the source may be implemented in one wellbore for an MWD operation, such as being integrated into a drill string such as the BHA, the receivers may be implemented in another wellbore on a drill string, in a wireline application, or any other means of deploying the receiver(s) such as the array of receivers or array of receiver subs in the second well.

Figure 18:
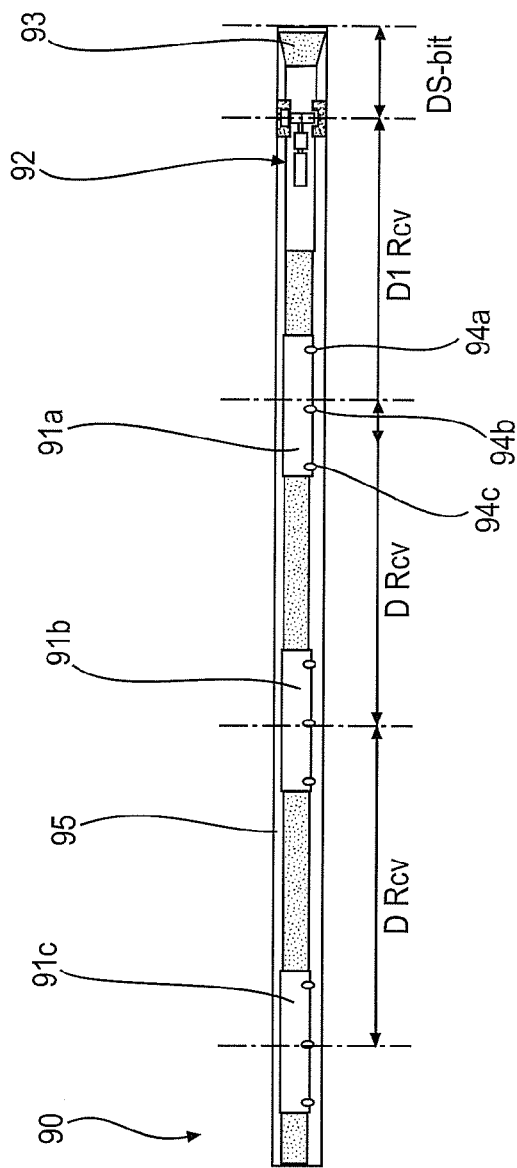
FIG. 18 is a schematic illustration of an embodiment of a downhole seismic borehole investigation system according to this disclosure, when one seismic source is installed.

FIG. 18 is a schematic illustration of an embodiment of single well seismic system in accordance with the present disclosure. The single well seismic system is implemented on a section of drill string 90 representing the BHA and including a drill bit 93 and three tubular sections 91*a*, 91*b*, 91*c* representing three receiver subs, respectively. The seismic source (the vibrator) 92 is also installed in the BHA. Around the tubular, the well defines a fluid annular 95 with the formation. This bottom section of the drill string 90 includes drill-collars just above the bit 93, with the drill string 90 being extended to the surface with drill-pipes. The drill-collar section can include MWD and LWD tools. In addition, a steerable system (e.g. motor or rotary steerable system) may also be installed just above the bit 93.

The seismic vibrator 92, as previously described, is installed into the lower extremity of the drill-string 90 nearby the drill bit 93 and for example above the steerable system. The distance D S-bit (in FIG. 18), which is the distance between the bit 93 and the source 92, is typically small in comparison to the seismic wave length of interest. When the source 92 is nearby the drill bit 93, wave propagation in the tubular (drill string 90) and annulus 95 will be simplified as single waves propagating in place of direct (upwards) and reflected waves at the lower extremity of the drill-string 90 and wellbore. However, the seismic source 92 can also be placed at other locations along the drill string 90.

Figure 19:
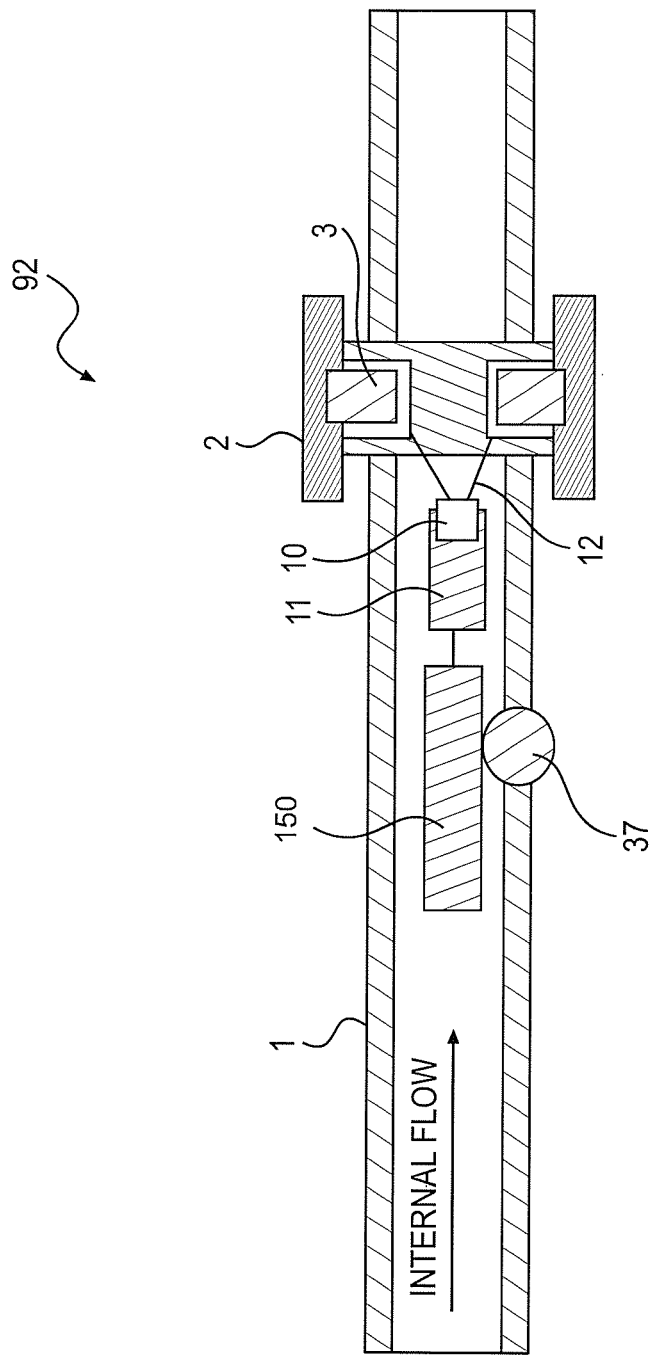
FIG. 19 is a schematic illustration of an embodiment of a seismic vibrator inside a collar.

FIG. 19 describes the seismic source (vibrator) 92. The downhole source (vibrator) 92 includes a drill tubular (collar) 1 supporting at its lower extremity the push pads 2 activated by the push pistons 3. The intake valve 10 is typically mounted at the center of the tubular 1 such that part of the main internal flow diverts towards the push pistons 3 via the channel 12. The valve 10 is operated by the motor 11 which is controlled by a control unit (e.g., 150 of FIGS. 8&15). In some embodiments, the control unit, motor 11 and valve 10 are on the axis of the tubular 1. Near field hydrophone 37 is mounted onto the tubular 1 with its measurement output connected to the control unit.

FIG. 18 also provides an example receiver array. However, the receiver array may encompass other suitable configurations. In some embodiments, each sensor is affiliated with a specific (different) acquisition channel so that digital filtering can be applied for proper separation of signal and noise, as well as for steering the beam for optimum reception.

As shown in FIG. 18, the exemplified array includes an array of receiver subs 91*a*, 91*b*, 91*c* each of which contains several independent signal receivers 94*a*, 94*b*, 94*c* installed in each of three tubular sections. The signal receivers 94*a*, 94*b*, 94*c* are typically connected to individual seismic data acquisition channels. The signal receivers of each receiver sub are combined to form a group of seismic sensors. Each grouping may include a set of hydrophones and a set of geophones. It is also contemplated that the grouping could include a set of accelerometers in addition to or in lieu of one of the other sets of receivers. For example, in some embodiments, the grouping includes a set of hydrophones and a set of accelerometers.

Although three receiver subs are shown, two or more receiver subs are contemplated, for example 2-4 (or for example up to 10) receiver subs. The choice of the number of receiver subs is generally to balance imaging performance with expense. In some embodiments, the inter-receiver distance (D Rcv) is about 30 m, as measured from the center of one group to the center of an adjacent group, whereas the intra-receiver distance is about 3 m. Both the inter-receiver and intra-receiver distance may vary from the example of FIG. 18. For example, the inter-receiver sub distance may range from about 10 m to about 70 m, even about 100 m, and the intra-receiver distance may range from about 3 m to about 10 m.

Generally speaking, the inter- and intra-receiver spacings relate to the depth of view into the formation and the width of that view. In some embodiments, the receivers are configured to enable imaging seismic reflectors (e.g., bed boundaries) at a distance of up to about 200 m, or up to about 300 m, or up to about 400 m, or up to about 500 m while maintaining a resolution of about 10 meters or more. In some embodiments, even deeper imaging can be achieved, though such deep imaging may come at the expense of resolution. It should be noted that the distance between the receiver sub and the source (D1 Rcv) may be different than the nominal distance between successive receiver subs (D Rcv). Often D1 Rcv is half D Rcv, to simulate the common layout of surface seismic, where the source would be fired at mid-distance at the center of gravity of a sensor group.

In some embodiments, the receiver subs may include three hydrophones and three geophones. In some embodiments, each geophone and/or hydrophone is connected to its dedicated seismic data acquisition channel. In some embodiments, the number of receivers of each type is two or more, and the number of types of receivers is one or more. In some embodiments, a given type of seismic sensor is installed at from 2 to 4 axial positions in a given receiver sub. Generally speaking, the number of receivers may impact resolution, with multiple receivers resulting in increased resolution. In some embodiments, the sensors are installed such that they are coupled to the seismic signal travelling in the earth (and to the wellbore fluid as applicable), and decoupled (optimally decoupled) to the signal travelling in the collar (steel direct arrival). In further embodiments, coupling to the tube wave is minimized by the use of geophones in contact with the wellbore. In some embodiments, the geophone may be installed (for example near or in the blade of a stabilizer) such that if the well is slightly inclined, the collar would touch on one side allowing reception of the seismic signal travelling in the earth medium without transmission across the wellbore. In some embodiments, the geophone is a 1C geophone. In some embodiments the geophone is a 3C geophone. The receiver subs can be equipped with accelerometers (1C, 2C, 3C) in place of geophones.

Figure 20:
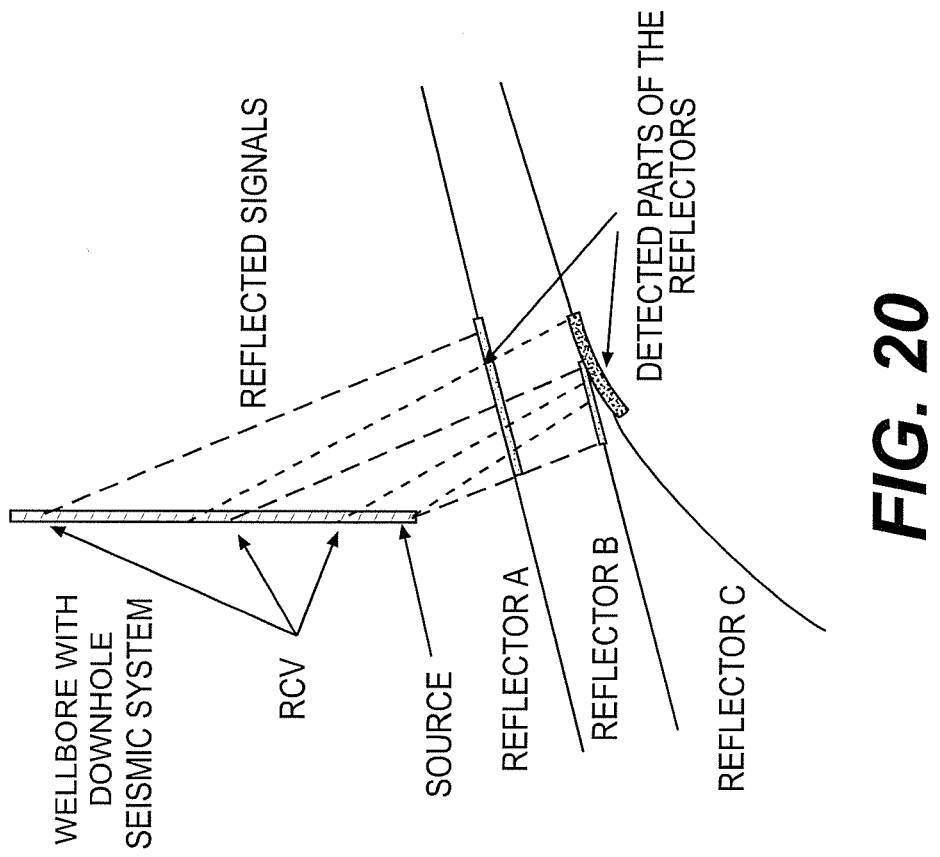
FIG. 20 is a schematic depiction of seismic rays travelling around a wellbore in case of a forwards reflector, allowing visualization of certain portions of the reflectors.

With the downhole system as shown in FIG. 18, it should be observed that the extent of the "detected" section of the reflectors may be limited, as the seismic signal travels from the source to the reflector where reflection occurs while respecting the law of reflection (incident angle=reflected angle; angle measured to the normal of the interface). FIG. 20 shows an example of this aspect of reflector visualization with the downhole system. The well is shown to be vertical with the BHA containing a source and 3 receivers. Several reflectors A, B, C are shown. A few ray paths from the source to the receivers are indicated: these ray paths respect approximately the rule of reflection angles. With such an example, the shaded portions of the reflectors are detected by the receivers. For other parts of the reflectors, the reflected signals do not return to the receivers. When combining information from multiple BHA positions, it should be noted that the up-dip part of the reflectors is mapped before the wellbore crosses the reflector, while the down-dip part is mapped after the crossing. In this example, using longer distances between receivers may result in increasing the extent of the detected part of the reflectors.

Figure 21:
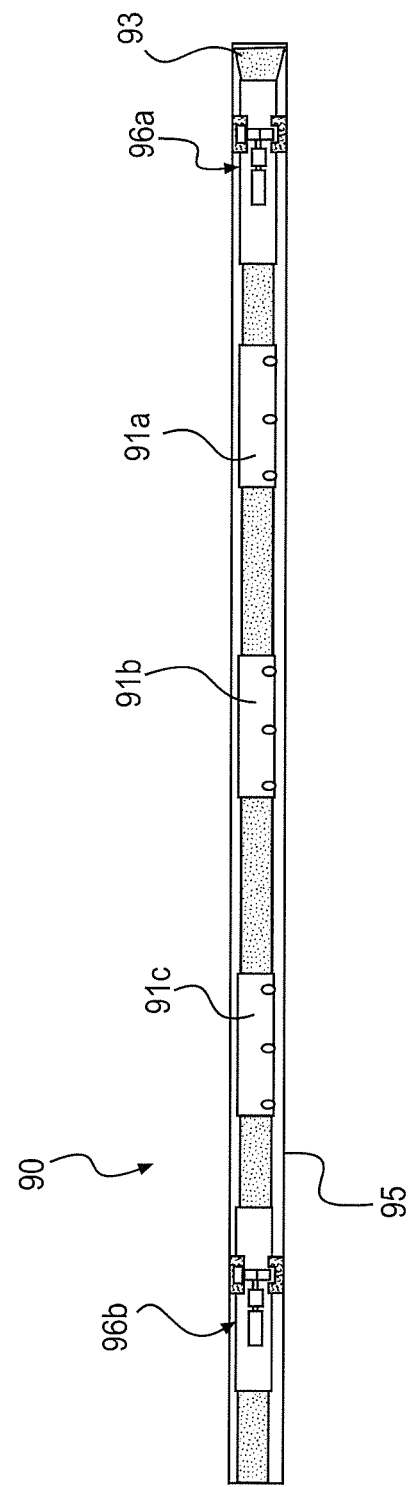
FIG. 21 is a schematic illustration of an embodiment of a downhole seismic borehole investigation system according to this disclosure, when two downhole seismic sources are installed.

An embodiment of a single well seismic system is provided in FIG. 21, which is similar to that of FIG. 18, except it includes a second source 96b installed in the BHA above all receiver subs 91a, 91b, 91c. As shown, the three receiver subs 91a, 91b, 91c are sandwiched between the first and second sources 96a, 96b. However, the sources 96a, 96b are not limited to being located at either end of the receiver subs 91a, 91b, 91c, but for example one source could be located in the middle of the receiver subs 91a, 91b, 91c.

Figure 22:
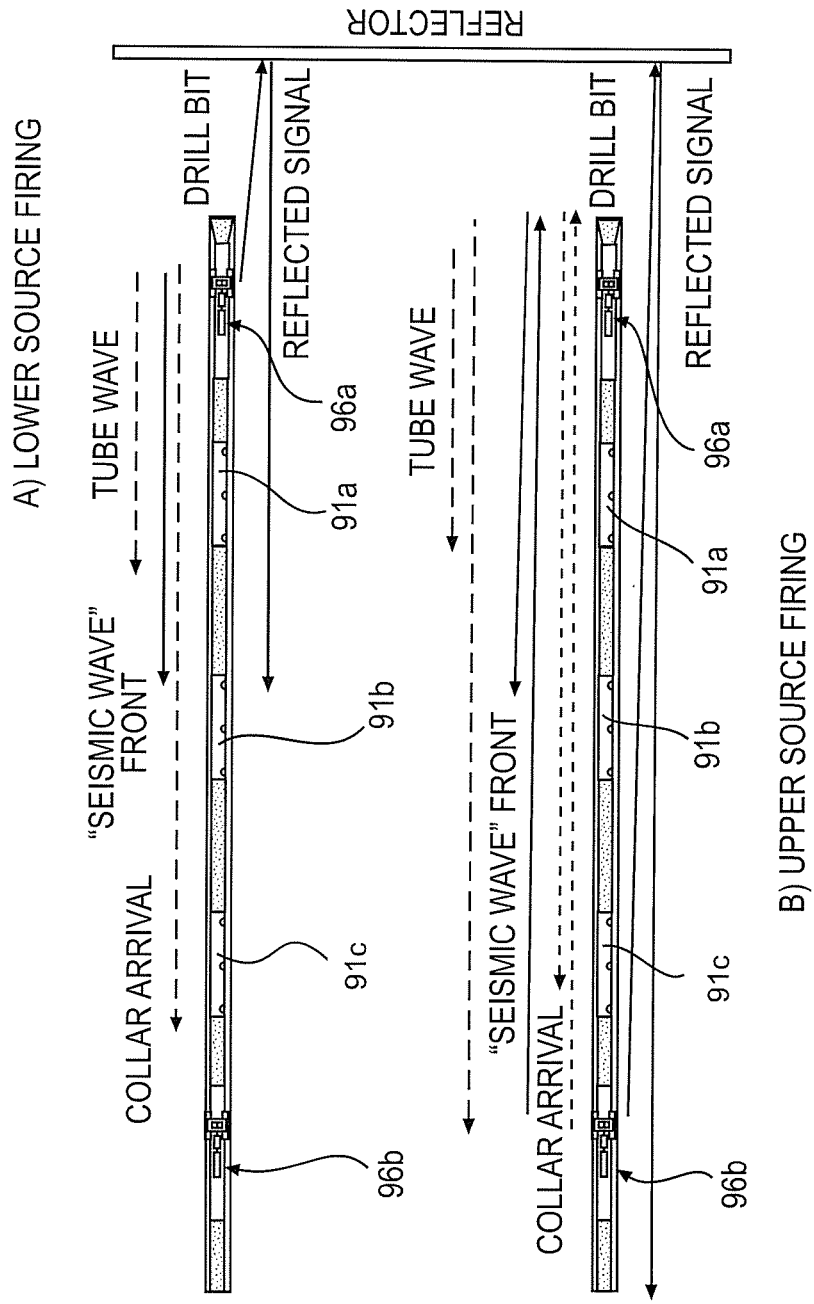
FIG. 22 is a schematic depiction of seismic rays travelling in and around a wellbore in case of a forwards reflector when two downhole sources are transmitting one in a given time.

Embodiments including two downhole sources may be useful in situations where the reflector is perpendicular to the wellbore (FIG. 22). In such cases, the reflected signal appears to travel parallel to the wellbore. The signal propagates as the "seismic wave front" (same velocity). Due to its late arrival (longer path), there may be overlap with the arrival of a tube wave or Rayleigh wave, making it difficult to detect and separate these signals. However, if two data acquisition cycles are performed by activating two sources 96a and 96b separately, the reflected signals from a reflector perpendicular to the wellbore arrives at a different delay versus the signal emission, facilitating separation of the reflected signal from the tube waves or Rayleigh waves.

Without wishing to be bound by theory, it is believed that the above embodiment facilitates wave separation based on the fact that the difference for arrival times at a given receiver for a given type of wave for the case of transmission from the lower and upper sources is directly related to the distance between the two sources, the distance between the lower source and the bottom of the well, as well as the seismic velocity of the particular type of wave. Insuring consistency between the detected arrival time (which enables computing wave propagation velocity) and the geometry facilitates confirmation of proper recognition of a wave. Also, if the reflected wave and tube wave arrive at the same time after firing of a given source, the superposition may not occur when the signal is transmitted by the other source as the paths would be different.

Figure 23:
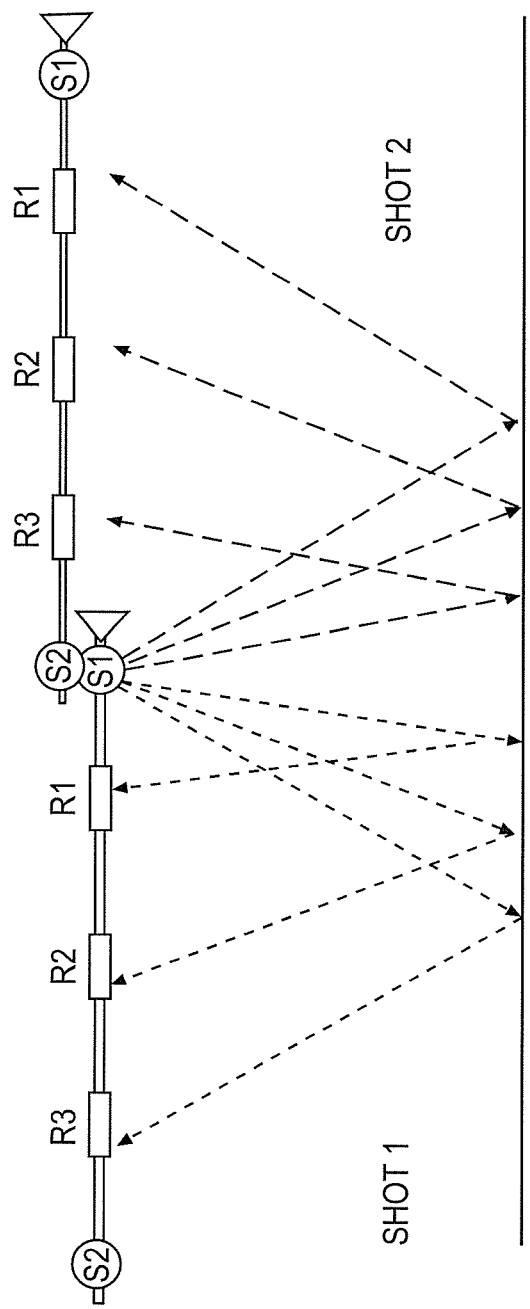
FIG. 23 describes a geometrical combination of two successive data acquisition sequences, using a BHA with two sources, and when the upper source has been located at the same position as the lower source during the first data acquisition.

When using two downhole sources, it is possible to group the acquired data to simulate a "split" spread (the source in the center of the acquisition array). This is shown in FIG. 23. For this embodiment, the seismic data set obtained with shot 1 and the lower source is grouped with the data set obtained with shot 2 and the upper source. When acquiring the second data set, the upper source is positioned at the same depth where the lower source was located during the first shot. The amplitudes of the two data sets can be normalized in relation to the amplitude recorded in the near-field of the source, enabling removal of the effect of amplitude variation (for example due to two different sources being used). With such a combination, as shown in FIG. 23, the total apparent distance covered by the receiver subs is doubled, which may result in properly imaging reflectors at greater distance from the wellbore, for example imaging a reflector with a larger dipping angle, more variation of reflector curvature, and/or separating reflectors close to each other, as the random noise would be lower and higher frequency signal may be recovered.

Figure 24:
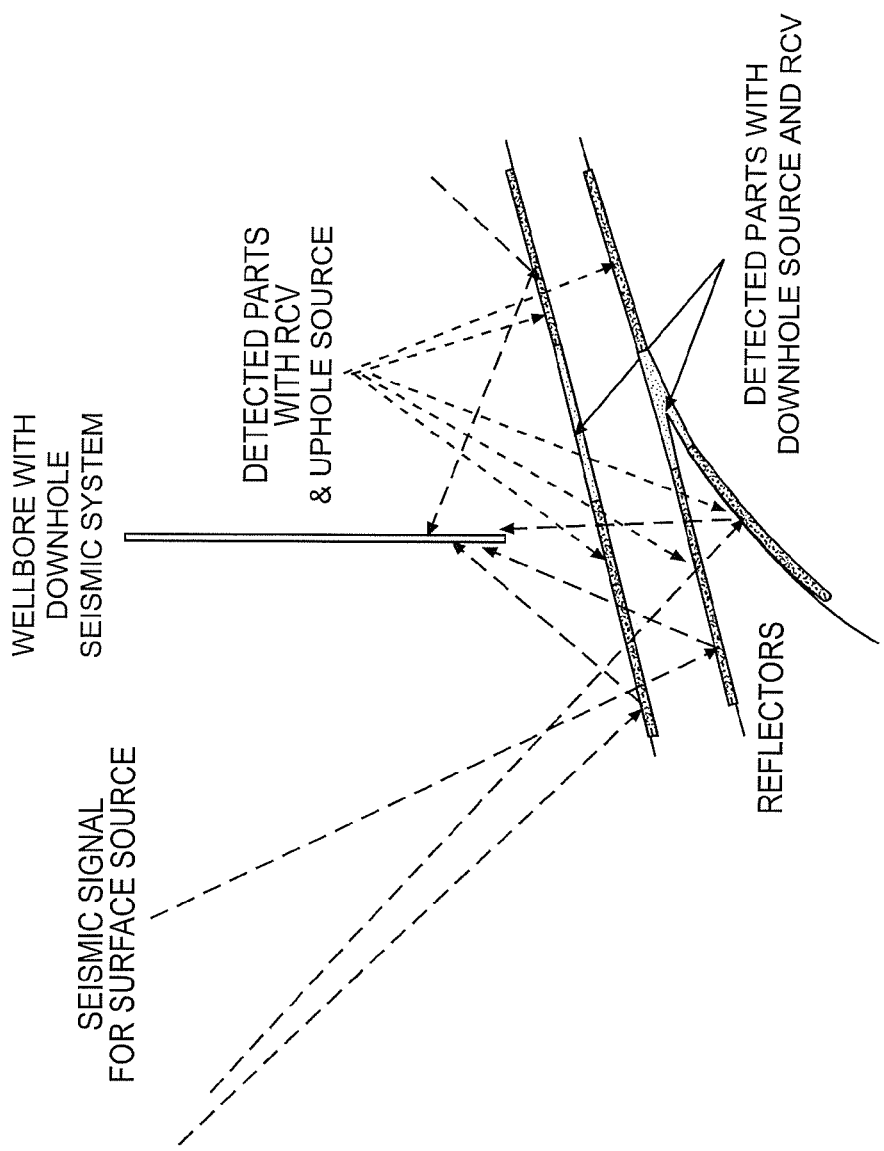
FIG. 24 is a schematic depiction of an enhanced width of view provided by combining the seismic investigation system of FIG. 20 with a second seismic source at the surface.

In some embodiments, the single well seismic system includes at least one downhole source, at least one downhole receiver, and at least one surface source (FIG. 24). For example, a single well seismic system can include the embodiment of FIG. 18 in addition to a second source located at the surface. As shown in FIG. 20, the downhole seismic system detects only part of the reflectors. The surface seismic source can move over wide offsets from the well versus the downhole seismic receiver (RCV), allowing detection of the reflectors for the downhole RCV over a longer extent. This is a good complement to the downhole source illumination, however due to the longer travel path of the seismic wave in the earth, the signal may be more attenuated especially the high frequency signal, and thus the image quality may be reduced.

In some embodiments including an additional surface seismic source, the system can further include a very stable (or drift compensated) clock so that the synchronization between the surface and downhole components is kept valid for an appropriately long duration. In some embodiments, a wiring system can be present from surface to downhole, such as wired-drill pipe telemetry or wireline data latching system, and is utilized for clock synchronization.

Seismic systems according to this disclosure may also include an electronics subsystem, for example that handles clock synchronization across receivers and/or data management, including data processing.

Data processing could include 3D seismic imaging, and/or some reflector attributes could be processed to determine some characteristics of the formation (such as velocity and impedance). For example, processing similar to that used in surface seismic or Vertical Seismic Profiles (VSP) could be adapted to the seismic systems described herein. For example, with respect to reflector attributes, in some embodiments where the receiver subs include 3C geophones, data processing may be used to estimate the tool-face of the reflector based upon the propagation direction of the reflected wave. This propagation direction may be influenced by the coupling factor of the two radial components of the 3C geophone. Accordingly, in further embodiments, to reduce the coupling effect, multiple data sets may be acquired at different angular positions of the drill string, supposing that the string is not rotated during each acquisition cycle. Then for each data set, using the angular position of the drill-string (the tool-face), the two radial data sets are rotated as a vibration vector in a pre-defined reference axis system, based on suitable tool-face measurement in the drill-string. Finally, the multiple rotated data in the reference axis system can be stacked; the stacking process may reduce the perturbation due to improper geophone coupling, as well as reduce the random noise. Such a processing can be performed downhole, when the downhole system performs the measurement of tool-face.

With respect to data processing (and in some embodiments corresponding data management), the systems described herein may generate considerable data. For example:
1000 samples/sec-16 bits resolution-2.5 sec-120 channels
16×1000×2.5×120=4.8 Mbit (approximately 5 Mbit)
3 source stations of 4 shots per minutes
Total=60 Mbit (before correlation)
Total=12 Mbit (after correlation)
Total=3 Mbit (after correlation & stack).

In some embodiments, the data (or subset thereof, as desired or as applicable) can be transferred to the surface using a wired system such as a wireline cable with data-latch connector to connect to the downhole seismic system or via a "wired-drill-pipe" telemetry technique such as provided by IntelliServ (NOV). In such a case, the data rate can reach about 50 kbit/s. In further embodiments, for example where a "wired-drill-pipe" telemetry system is used, the seismic data is recorded at the surface. In other embodiments, data transfer techniques are used in combination with data reduction techniques. For example, data reduction is performed in order to transmit in real-time a desired set of information, or improve the rate of transfer of information to surface. For example, when data reduction techniques such as correlation and stacking are performed, wired-drill-pipe telemetry may be able to transfer the seismic data to surface in about two minutes or less.

In some data reduction techniques, data stacking may be used. For example, as described above with respect to tool-face determination using 3C geophones, the amount of data can be reduced by the number N of stacked data sets. As another example, in seismic data acquisition, in some embodiments, shooting sequences may be repeated with no change in source RCV positions. Data volume may be reduced by the number of shots being stacked (for example, data volume may be reduced up to four-fold). In some embodiments, data stacking also reduces the overall random noise.

In some data reduction embodiments, downhole processing is performed to determine a few key reflectors near the seismic system. In some embodiments, data reduction involves cross-correlation of received versus transmitted data. In some embodiments, cross-correlation may reduce the amount of data up to three fold.

Figure 25:
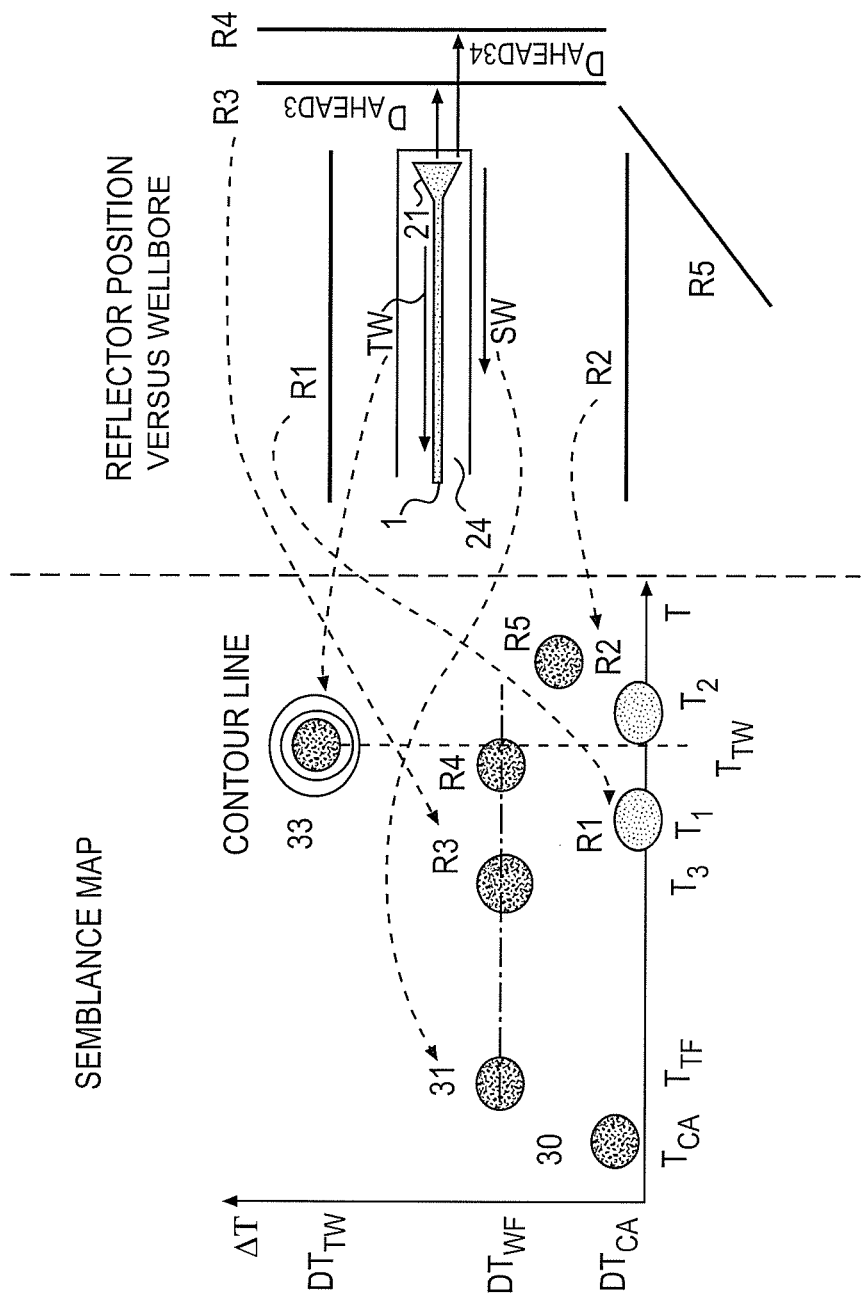
FIG. 25 is a semblance map useful for data reduction prior to transmission, showing the position of peaks in the semblance map versus the position of reflectors near a wellbore.

In some embodiments, the downhole cross-correlation processing can be performed on the data of each receiver to perform "beam steering" for each small time interval over the whole seismic record. In some embodiments, the processing can be based on "semblance analysis" between the recorded signals of one receiver. The analysis includes cross-correlation between traces in every short length window, which have been shifted by a small delta time ($\Delta t$) between adjacent receivers to determine the semblance between traces for a certain time delay (see FIG. 25). The semblance between traces for a given time shift is the correlation factor in this shifted small time window. The cross-correlation coefficient for each correlation is mapped as the vertical ($3^{rd}$) axis over a "2-dimensional" space, where the X-axis is arrival (seismic) time and the Y-axis being the shifted time ($\Delta T$). The resulting 3-D plot would display hills and valleys: the peaks correspond to good correlation. In practice, the 3-D hill/valley plot is displayed by contour lines (similar to a topography map), with each contour line corresponding to a given value of correlation coefficient. The peak value of these contour lines corresponds to seismic wave passing near the receiver. FIG. 25 shows the correspondence between reflector positions versus the wellbore (shown on the right) and the peak of the contour line position on the semblance map (at the left). The left of the figure represents a well 24 with a collar 1 which includes a source near the bit 21 and more than two receivers in the same tubular above the bit. The well 24 is surrounded by formation. Typically the receivers are at limited distance from each other to form a group of receivers. The receiver spacing inside the group is typically smaller than the distance from the group center to the source. "Semblance Analysis" is more fully described in a co-pending application, filed concurrently herewith, also assigned to Schlumberger, and entitled: "DATA PROCESSING SYSTEMS AND METHODS FOR DOWNHOLE SEISMIC INVESTIGATIONS." The referenced co-pending signal processing application is hereby incorporated by reference in its entirety.

Methods.

The present disclosure provides methods for acquiring seismic data downhole using the devices and systems described herein. Generally, the methods include operating the downhole vibrator to generate a seismic signal, and acquiring seismic data with one or more sensors. In some embodiments, the seismic signal is a low frequency signal. In further embodiments, the seismic signal is a sweep wave encompassing a range of low frequencies, for example up to about 700 Hz, or from about 5 Hz or about 10 Hz up to about 700 Hz, or up to about 500 Hz, or up to about 400 Hz, or up to about 300 Hz, or up to about 250 Hz.

In some applications, the vibrator can be operated while moving, such as during rotary drilling, especially when the vibrator is equipped with an independent vibrator sleeve (so that the pads are not entrained at the same rotation as the drill-string). In other applications, the downhole vibrator can be operated when the tubular string is static in the wellbore in order to limit the noise level for the imaging technique. For example, in some embodiments, the seismic acquisition is performed "off bottom"—the bit is lifted by a short distance from the well bottom and the drill string rotation is stopped. As rotation and drilling are suspended, the "acoustic" noise is reduced enabling the desired seismic data acquisition with minimum perturbation. An acquisition cycle is typically about 15 seconds or less. During this period, the drill string is kept steady in the wellbore. In some embodiments, acquisitions are performed with the source being moved at nearly uniform intervals between acquisitions. The interval may vary, for example, about 3 meters. With such an interval, in some embodiments, the process includes performing a seismic data acquisition for three different source positions, approximately 3 meters apart, after each new joint is drilled (approximately 10 meters).

Power for activating the seismic vibrator and/or performing the acquisition may come, for example, from power generated by mud flow and/or from battery power. Thus, although not required, the mud flow may be kept active to allow generation of downhole power as is typical for MWD/LWD operations. In such cases, when utilizing the difference of pressure from inside to outside, high amplitude seismic signal (up to about 60,000 Newtons) can be generated at the downhole source, as a method to activate the pads. A retraction system can be associated with the pads, so that the pads are retracted when the vibrator is not in action. This insures that the pads are not submitted to contact with the wellbore during the vibrator inactive phase, limiting wear and tear. The retraction mechanism can be a low force spring. If the pads are ruggedized enough, chamfers on the edge of the pad may enable pushing the pad backwards when unused and entering in contact with wellbore wall.

In some applications, the for feedback control between force output estimate and valve positioning can be based on non-linear transfer function which includes non-linear behavior of hydraulic loss across the control valve and supply channels. In some cases, the non-linear transfer function can be linearized in some operating range, allowing to use more standard feedback control logic and stability criteria.

In some embodiments, the vibrator can perform some calibration before generating the frequency sweep: the calibration may include applying the pads against the borehole and running a constant frequency first to record the pad and force behavior versus valve opening position. This step can be performed at several frequencies. This knowledge (calibration) can then be used for the frequency sweep to optimize the valve position versus time and obtain the best sweep quality with minimum harmonic.

In some embodiments, where the system includes two down-hole sources, the acquired data may be grouped to simulate a "split" spread (i.e. the source is in the center of the acquisition array) as is typical in land seismic. As shown in FIG. 23, the seismic data set obtained with shot 1 and the lower source can be grouped with the data set obtained with shot 2 and the upper source. When acquiring the second data set, the upper source can be positioned at the same depth as the lower source was located during the first shot. The amplitudes of the two data sets can be normalized in relation to the amplitude recorded in the near-field of the sources, enabling removal of the effect of amplitude variation. In some embodiments, this split spread method provides an imaging method allowing larger portions of the illuminated reflector to be viewed. Also, by combining data from more receivers to perform the same image output, the overall signal-to-noise ratio may be improved, as well as slightly better conservation of the high frequency content of the signal. This method may allow higher resolution and improved capability to separate close reflectors (thanks to higher frequency).

The usage of two downhole sources allows also better recognition of reflector forwards to the bottom of the wellbore and quite-perpendicular to the wellbore. This improved recognition is obtained by improved capability of separating the multiple waves travelling parallel to the wellbore.

In some embodiments, the method further includes deploying a seismic source according to this disclosure in one well, and installing a receiver array in another well. In some embodiments, the source is installed in the wellbore being drilled, while the receiving station is lowered as wireline system in the other well. In some embodiments, the method includes processing the acquired data to determine the toolface and the dip of the receiving seismic ray. The distance between the well could be estimated using an estimation of seismic velocity between the well (either obtained from surface seismic, or from downhole seismic). In some embodiments, this well localization method can be applied for avoiding well collision and/or for positioning a well correctly versus another well.

In some embodiments, a Drill String Test (DST) string may include the low frequency borehole seismic system. When the packer is not set, fluid can be circulated and the source activated. In some embodiments, when integrated into a DST string, the system can be used to map the reflector near the reservoir. If the well is cased, it should be noted that the seismic signal will not be affected strongly. When the packer is set, it may be more difficult to use the downhole source. The downhole receiver arrays can be used to monitor the noise generated in the formation during pressure change. The noise is partially due to the DARCY flow in the pore, phase change and change of stress in the rock due to the sudden pore pressure change. This may be quite effective in fractured carbonate as the change of fracture width is probably a source of noise. In some embodiments, a surface source can be used to perform a VSP during the DST draw-down period or pressure-build period. The VSP could be performed as local 4D seismic to evaluate the variation between the DST phases.

In some embodiments, the downhole seismic system can be installed in the wellbore to frac (as part of frac tubing). It can be used in a similar way as for DST (i.e. mapping reflectors and/or noise recording from formation frac propagation among other possibilities). In the case of either DST string applications or frac operations, the seismic vibrator can be operated while the downhole production is closed and the annulus circulation valve is open. The flow and pressure distribution can be similar to the one related to drilling operation.

A number of embodiments have been described. Nevertheless it will be understood that various modifications may be made without departing from the spirit and scope of the disclosure. Accordingly, other embodiments are included as part of the disclosure and may be encompassed by the attached claims. Furthermore, the foregoing description of various embodiments does not necessarily imply exclusion. For example, "some" embodiments or "other" embodiments may include all or part of "some", "other" and "further" embodiments within the scope of this disclosure.

What is claimed is:

1. A seismic source device for transmitting a seismic signal into a formation surrounding a borehole, comprising:
   a. a drill-string tubular;
   b. at least two force generating members retractably connected to the tubular at substantially the same axial position, each comprising;
      a contact pad directly connected to a movable member via a ball joint; and
   c. a control system for activating the at least two force generating members to engage a borehole wall and transmit the seismic signal into the formation;
   wherein the moveable member is a controlled pushing system for engaging the contact pad with the borehole wall.

2. A device according to claim 1, wherein the transmitted seismic signal comprises a swept frequency signal having frequencies ranging up to about 700 Hz, optionally including one or more generated harmonics in the swept frequency signal.

3. A device according to claim 1, wherein the at least two force generating members are distributed about the tubular in an axis-symmetric pattern.

4. A device according to claim 3, wherein the at least two force generating members comprise a first pair of force generating members positioned 180 degrees apart and a second pair of force generating members positioned 180 degrees apart, wherein the first pair of force generating members are shifted by 90 degrees from the second pair of force generating members.

5. A device according to claim 4, wherein the control system activates the first pair asynchronously from the second pair.

6. A device according to claim 1, wherein the at least two force generating members transmit a sinusoidal seismic signal that is swept in frequency.

7. A device according to claim 1, wherein the controlled pushing system is activated by a hydraulic piston.

8. A device according to claim 1, wherein the control system controls a valve system that delivers hydraulic pressure for activating the at least two force generating members, wherein the hydraulic pressure is derived from mud flow in the tubular.

9. A device according to claim 1, further comprising a feedback control for maintaining a signal according to a reference signal.

10. A device according to claim 9, wherein the feedback control allows to deliver seismic force having substantially constant amplitude and with varying frequencies to a borehole wall, using at least one downhole measurement as input for the feedback control.

11. A device according to claim 9, wherein a non-linear transfer function that has been linearized over a frequency bandwidth is used for feedback control.

12. A device according to claim 11, wherein a force output is calibrated versus valve control for pre-defined frequencies before generating frequency sweep, and wherein the transfer function is optimized by using the calibrated response of the force output.

13. A borehole seismic system for acquiring an amount of seismic data downhole, comprising:
   a. at least one downhole seismic source according to claim 1; and
   b. at least one downhole seismic receiver;
wherein the system is a single well seismic investigation system.

14. A system according to claim 13, wherein the at least one receiver is a receiver sub mounted on the drill-string tubular, the receiver sub comprises at least two seismic sensors, and wherein the seismic source is located on a first tubular of the drill string, and the receiver sub is located on a second tubular of the drill string.

15. A system according to claim 13, further comprising a data processing system, and wherein the control system activates the seismic source to transmit a swept frequency signal comprising frequencies ranging from about 10 Hz to about 250 Hz such that the data processing system can determine the location and orientation of bed boundaries up to about 500 meters around the drill string and ahead of a drill bit.

16. A system according to claim 13, further comprising an additional surface source, enabling seismic data acquisition by the downhole receiver(s) when either the surface source or the downhole source(s) is activated.

17. A method for borehole seismic investigation, comprising:
   a. lowering a drill string comprising a bottom hole assembly (BHA) into a borehole, wherein the BHA comprises a seismic source integrated with a first tubular, and the seismic source comprises at least two force generating members retractably connected to the first tubular,
   b. activating the seismic source to transmit a low frequency seismic signal into a formation surrounding the borehole; and
   c. acquiring seismic data at a receiver sub comprising at least two receivers, which receiver sub is integrated with a second tubular;
wherein the seismic source and the receiver sub can be deployed in the same well or in different wells;
wherein each one of the at least two force generating members comprises a moveable member and a contact pad that is directly connected to the movable member via a ball joint;
wherein the moveable member is a controlled pushing system for engaging the the contact pad with the borehole.

18. A method according to claim 17, further comprising reducing the amount of acquired data prior to transmission to a surface above the borehole by determining a location and orientation of a desired number of bed boundaries from the acquired data.

19. A method according to claim 17, further comprising performing semblance processing between multiple recorded seismic signals by the receivers for a same transmitted signal, wherein the semblance is characterized by small time intervals shifted by small delta time.

20. A method according to claim 17, further comprising synchronously activating the at least two force generating members to generate the seismic signal.

21. A method according to claim 17, further comprising activating the source when drilling is stopped, and pulling a bit on the BHA a short distance toward surface from the well bottom and/or adding tubular members to the drill string.

22. A method according to claim 17, wherein the seismic source comprises an upper source and a lower source, and the receiver sub is located on a section of the drill string between the upper and lower sources, and the method further comprises: firing the lower source at a first location and acquiring a first data set; moving the drill string to position the upper source at the first location where the lower source was fired; firing the upper source and acquiring a second data set; and grouping the first data set with the second data set for analysis.

23. The seismic source of claim 1, further comprising:
   d. a sleeve that is free in rotation versus the tubular wherein the at least two force generating members retractably connected to the sleeve at substantially the same axial position.

* * * * *